(12) United States Patent
Baar et al.

(10) Patent No.: US 9,776,423 B2
(45) Date of Patent: Oct. 3, 2017

(54) WEB-FED INKJET PRINTING PRESS AND METHOD FOR PRINTING A PRINTING MATERIAL

(71) Applicant: KOENIG & BAUER AG, Würzburg (DE)

(72) Inventors: Oliver Christian Baar, Holzgerlingen (DE); Klaus Eppich, Unterpleichfeld (DE); Sven Michael, Friedelsheim (DE)

(73) Assignee: KOENIG & BAUER AG, Wurzburg (DE)

( * ) Notice: Subject to any disclaimer, the term of this patent is extended or adjusted under 35 U.S.C. 154(b) by 0 days.

(21) Appl. No.: 15/023,699

(22) PCT Filed: Sep. 23, 2014

(86) PCT No.: PCT/EP2014/070173
§ 371 (c)(1),
(2) Date: Mar. 22, 2016

(87) PCT Pub. No.: WO2015/044100
PCT Pub. Date: Apr. 2, 2015

(65) Prior Publication Data
US 2016/0207326 A1    Jul. 21, 2016

(30) Foreign Application Priority Data
Sep. 25, 2013  (DE) .......................... 10 2013 219 259
Dec. 20, 2013  (DE) .......................... 10 2013 226 837

(51) Int. Cl.
*B41J 2/21*   (2006.01)
*C09D 11/322*   (2014.01)
(Continued)

(52) U.S. Cl.
CPC ................. *B41J 2/21* (2013.01); *B41J 15/04* (2013.01); *C09D 11/106* (2013.01);
(Continued)

(58) Field of Classification Search
CPC ..... B41J 2/21; B41J 15/04; B41J 3/60; C09D 11/106; C09D 11/322; B41M 5/0023
See application file for complete search history.

(56) References Cited

U.S. PATENT DOCUMENTS 5,566,616 A   10/1996  Schleinz et al.
6,053,107 A    4/2000  Hertel et al.
(Continued)

FOREIGN PATENT DOCUMENTS

DE   102006004341 A1   8/2006
DE       60029410 T2   2/2007
(Continued)

OTHER PUBLICATIONS

International Search Report of PCT/EP2014/070173 dated Dec. 5, 2014.
(Continued)

*Primary Examiner* — Henok Legesse
(74) *Attorney, Agent, or Firm* — Mattingly & Malur, PC

(57) ABSTRACT

A web-fed inkjet printing press has at least one printing unit and uses a printing material which is configured as a printing material web which is guided or which can be guided through the printing unit and which can be printed by at least one inkjet print head in the printing unit in a printing process with a printing color of a defined hue which is configured as ink. The inkjet print head in the printing unit is directed directly onto the printing material. A printing material web is made from a mechanical paper with a weight per unit area between 3.5 and 80 g/m$^2$ and/or with a surface to be printed with a roughness according Bendtsen of at least 30 ml/min and or a thickness of from 50 to 120 μm which is guided through the printing unit. The printing material web, in order to be printed, is in interaction indirectly or directly with the at least one inkjet print head of the printing unit. The inkjet print had has an ink reservoir or has a line connection to an
(Continued)

ink reservoir with a water-based printing color which is configured as ink and comprises both color pigments and a polymer or a copolymer as constituent parts.

12 Claims, 4 Drawing Sheets

(51) Int. Cl.
- *B41J 15/04* (2006.01)
- *C09D 11/106* (2014.01)
- *B41M 5/00* (2006.01)
- *B41J 3/60* (2006.01)

(52) U.S. Cl.
CPC ............... *C09D 11/322* (2013.01); *B41J 3/60* (2013.01); *B41M 5/0023* (2013.01)

(56) References Cited

U.S. PATENT DOCUMENTS

| | | | |
|---|---|---|---|
| 6,541,590 | B1 | 4/2003 | Johnson et al. |
| 7,758,922 | B2 | 7/2010 | Simon |
| 2008/0055385 | A1 | 3/2008 | Houjou |
| 2008/0289784 | A1* | 11/2008 | Pietikainen .......... D21G 1/0066 162/135 |
| 2009/0315926 | A1* | 12/2009 | Yamanobe ............ B41J 2/0057 347/6 |
| 2011/0061826 | A1* | 3/2011 | Leskela ................. D21H 15/12 162/132 |
| 2011/0128338 | A1 | 6/2011 | DeCook et al. |
| 2012/0154498 | A1 | 6/2012 | Chiwata |
| 2015/0025179 | A1* | 1/2015 | Landa ...................... C08K 3/04 524/88 |

FOREIGN PATENT DOCUMENTS

| | | |
|---|---|---|
| DE | 202009003960 U1 | 7/2009 |
| DE | 102011076899 A1 | 12/2012 |
| EP | 2202081 A1 | 6/2010 |
| JP | 2003-063707 A | 3/2003 |
| WO | 2013/132439 A1 | 9/2013 |

OTHER PUBLICATIONS

Klaus Schmidt, "Digitale Strategie eines klassischen Druckmaschinenbauers" Druckforum Filderstadt Feb. 1, 2013.

M. Lechthaler, et al., "Roughness and Topography—A Comparison of Different Measurement", Wochenblatt Fur Papierfabrikation 21, 2006, pp. 1227-1234.

* cited by examiner a)

b)

WEB-FED INKJET PRINTING PRESS AND METHOD FOR PRINTING A PRINTING MATERIAL

CROSS-REFERENCE TO RELATED APPLICATIONS

This application is the U.S. National Phase, under 35 U.S.C §371, of PCT/EP2014/070173, filed Sep. 23, 2014, published as WO 2015/044100A1 on Apr. 2, 2015 and claiming priority to DE 10 2013 219 259.2, filed Sep. 25, 2013 and to DE 10 2013 226 837.8, filed Dec. 20, 2013, the disclosures of which are expressly incorporated herein by reference.

FIELD OF THE INVENTION

The present invention relates to a web-fed inkjet printing press, and a method for printing a printing material. The web-fed inkjet printing press has at least one printing unit and has a printing material which is embodied as a printing material web which can be guided through the printing unit and which can be printed by at least one inkjet print head in the printing unit, in an inkjet process, with a water-based printing color of a defined hue which is embodied as ink. The inkjet print head of the printing unit is directed directly onto the printing material web. In a method for printing a printing material in a web-fed inkjet printing press, in which the printing material is printed in at least one printing unit, in one of a direct and an indirect inkjet method, with a printing color embodied as a water-based ink, the printing ink is applied by at least one inkjet print head directly to the printing material.

BACKGROUND OF THE INVENTION

Various printing methods which can be used in printing presses are known. One such printing method is inkjet printing or ink-jet printing. In this method, individual droplets of printing ink are ejected from nozzles of print heads and are transferred to a printing material such that a printed image is produced on the printing material. By actuating a plurality of nozzles individually, different printed images can be produced. This method does not involve a solid printing forme, thus it is possible to configure each printed product individually. This allows personalized printed products to be produced and/or allows small batches of printed products to be produced at low cost since no printing formes are used.

The precise alignment of printed images on the front and back sides of a printing material that is printed on both sides is referred to as register (DIN 16500-2). In multicolor printing, the merging and precise correlation of individual printed images of different colors to form a single image is referred to as color-to-color registration (DIN 16500-2). Suitable measures are also necessary in inkjet printing in order to maintain color-to-color registration and/or register.

DE 10 2006 004 341 A1 discloses a pretreatment and/or precoating of nonabsorbent substrates for printing with an inkjet printer using a polymerizable, acrylate-containing ink, in which ink for the inkjet printing is applied to the coating in a time- or space-dependent manner before the application of the ink (inline) to the substrate, or the ink is applied independently of the time at which the coating is applied to the substrate, and the ink applied to the substrate or the coating may optionally be heat treated using a temperature control device.

EP 2 202 081 A1 and JP 2003-063707 A each disclose a printing press, wherein the printing press has a first printing unit and a dryer, wherein the first printing unit has a central cylinder having a dedicated drive motor assigned to the first central cylinder and having at least one inkjet print head.

U.S. Pat. No. 5,566,616 A discloses a printing press which has a rotatable central cylinder, inkjet print heads, a cooling device and a dryer, which operates using temperature and air flow or alternatively using radiation-induced curing.

U.S. Pat. No. 6,053,107 A discloses a printing press which has a driven central cylinder and a dryer having a cooling unit.

DE 10 2011 076 899 A1 discloses a printing press which has at least one printing unit and at least one print head configured as an inkjet print head.

WO 2013/132439 A1 discloses a printing ink for an inkjet printing method. To overcome the problems that arise during indirect inkjet printing when ink is applied to the e.g. silicone-containing transfer tape, the printing ink comprises an organic polymer, i.a. A plurality of ink compositions and ranges for the compositions are disclosed, including water-based inks containing polymers and pigments. In embodiments not specified in greater detail, inks can have pigments having a maximum particle size of 120 μm.

A presentation by Mr. Oliver Baar, which can be retrieved from the Verband Druck und Medien [Association of Print and Media] (VDM) webpage at http://www.verband-druck-bw.de and which was published, according to the VDM webpage, as part of Druckforum [Printing Forum] 2013 held on 1 Feb. 2013 in Filderstadt, describes a web-fed printing press having an inkjet printing unit and as the ink system, a water-based pigment-polymer ink.

Another presentation by Mr. Klaus Eppich, which can be retrieved from the Verband Druck und Medien (VDM) webpage at http://www.verband-druck-bw.de and which was published, according to the VDM webpage, as part of Druckforum 2013 held on 1 Feb. 2013 in Filderstadt, describes a wide range of possible applications for the KBA RotaJET printing press and analyzes these applications in terms of their relevance.

DE 20 2009 003 960 U1 discloses a cooling system for cooling a coated or uncoated fibrous web. In the case of fine paper and cardboard, an effective cooling solution is particularly important in order to cool the web before it is rolled.

In an article entitled "Rauigkeit and Topographie—ein Vergleich unterschiedlicher Messverfahren" ["Roughness and Topography—a comparison of various measurement methods"] by M. Lechthaler and W. Bauer, published in the "Wochenblatt für Papierfabrikation" ["Paper Manufacturing Weekly"], 21-2006, various measurement methods for determining the roughness and topography of paper are described and compared with one another.

DE 600 29 410 T2 discloses inkjet inks that contain, i.a. polymeric binders and colorants, e.g. water-soluble dyes or insoluble pigments.

US 2008/0055385 A1 discloses an aqueous ink which comprises a polymer fraction, and comprises pigments as a coloring agent. A transfer member that has been loaded in advance with a liquid is printed with the ink by means of ink heads, and transfers the print image in an indirect process to the printing material. As printing material, normal paper having moderate roughness, for example, or a smooth, coated paper may be used.

US 2011/0128338 A1 relates to a modular transport system for transporting a printing material through an inkjet printing press. The printing press comprises two modules, each having one or more print heads directed onto the web-type printing material. The transport system is suitable for printing processes in which printing materials are dampened during printing. This applies even to printing materials that tend to stretch in the longitudinal and the transverse direction, as is the case, for example, with cellulose-based printing materials that become dampened by water-based ink.

US 2011/0061826 A1 discloses a multilayer fiber product having, e.g., a weight per unit area of 25 to 100 g/m² and a method for its production, wherein the method comprises applying a fiber layer which contains a filler and which forms a surface layer of the fiber product to both sides of a center layer comprising at least one fiber layer. In this process, filler material and additive are added to the pulp that is used in the surface layers of the multilayer product. The filler material of the surface layers consists at least partially of cellulose or lignocellulose fibrils, onto which light-scattering material particles have been deposited.

SUMMARY OF THE INVENTION

The object of the present invention is to provide a web-fed inkjet printing press, a printing ink and a method for printing a printing material.

The object is attained according to the invention by the provision of a printing material web made of a wood-containing paper containing at least 2% by weight woody fibers having a weight per unit area of between 35 and 80 g/m² meter and having a surface to be printed that has a Bendsten roughness of at least 30 ml per minute. The printing material is guided through the printing unit and, in order to be printed, interacts directly with at least one inkjet print head of the printing unit. The inkjet print head has an ink reservoir or a line connection to an ink reservoir containing a water-based printing color, which is embodied as ink and which comprises, as constituents, both color pigments and a polymer or copolymer. The inkjet print head in the printing unit is directed directly onto the printing material which is wrapped around a central cylinder.

The printing press and/or the printing ink and/or the method offer a superior advantage in terms of production capability which is—for inkjet printing, relatively—cost-effective and/or particularly diverse, but is nevertheless capable of meeting high quality standards, particularly in a printing press, in which printed products can be produced on an individualized basis and/or very small print runs can be printed economically.

Of particular importance is an embodiment in which an expanded and/or broad spectrum of printing materials, in one advantageous embodiment even nonabsorbent or minimally absorbent printing substrates and/or materials, can be printed in an industrial inkjet printing process.

In one variant in which, e.g. a wood-containing paper having a weight per unit area of between 35 and 80 g/m² and/or having a surface for printing that does not necessarily require extra treatment and/or smoothing is used as the printing material, a relatively more advantageous paper, e.g. newsprint and/or offset paper, e.g. an uncoated or minimally or lightly coated paper that is not subjected to any additional surface treatment can be used for production. Costly special papers such as have heretofore been necessary for high-quality inkjet printing are not necessary.

In one embodiment, surface finishing or pretreatment using a corona device placed in the printing material path of the printing press, as is known from the prior art for pretreating printing materials prior to printing, can be dispensed with.

In one advantageous embodiment, an application device for applying energy or a substrate by which the polymerization process can be initiated and/or accelerated is provided. This serves to ensure only a minimal penetration and/or flow of color pigments, even in printing materials that are not specifically optimized for inkjet printing.

In a particularly preferred embodiment of the printing ink containing a polymer, the penetration of the color pigments together with the aqueous phase into the printing material can be prevented. The sharpness and color intensity of the printed image are thereby increased. The polymer can advantageously be a styrene polymer, a halogenated hydrocarbon polymer, a vinyl polymer, a fluorinated acrylic polymer, a fluorinated or non-fluorinated methacrylic polymer, a polyether copolymerizate or copolymers thereof, or a mixture of two or more of the stated substances, but is preferably embodied as an acrylic-based polymer or copolymer, or in an alternative embodiment as an ethylene polymer, as a propylene polymer or as butene polymer. The printing ink is preferably embodied as aqueous, which results in advantages with respect to environmental safety and waste water and/or waste disposal costs, for example.

Printing on a printing material as described above is particularly advantageous in terms of cost. By printing on a non-inkjet-optimized paper, for example, with the polymer-containing water-based printing ink, a high level of quality is achieved.

In one embodiment of the printing press which is advantageous in terms of equipment costs, the printing press can operate using the direct method, in which the printing color or ink is applied by the print heads directly to the substrate, i.e. the printing material. In a variant that is somewhat more expensive but in some circumstances is more advantageous with respect to color application, an indirect method that uses a transfer means embodied particularly as a transfer cylinder may also alternatively be provided.

BRIEF DESCRIPTION OF THE DRAWINGS

Embodiment examples of the present invention are illustrated in the set of drawings and will be specified in greater detail in the following.

The drawings show.

DESCRIPTION OF PREFERRED EMBODIMENTS

Figure 1A:
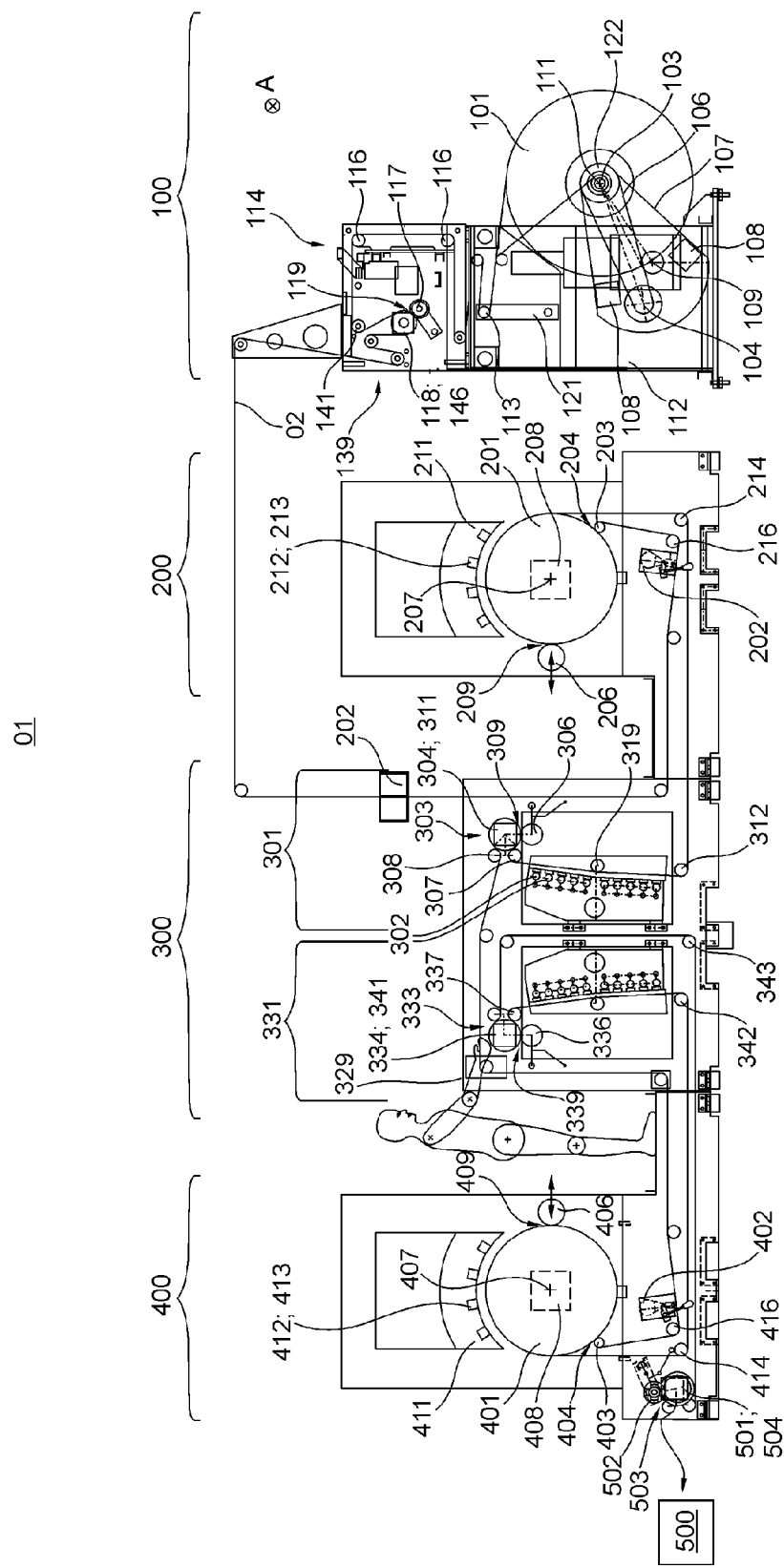
FIG. 1 a schematic representation of a printing press having a) a first and b) an alternate web path.
Figure 1B:
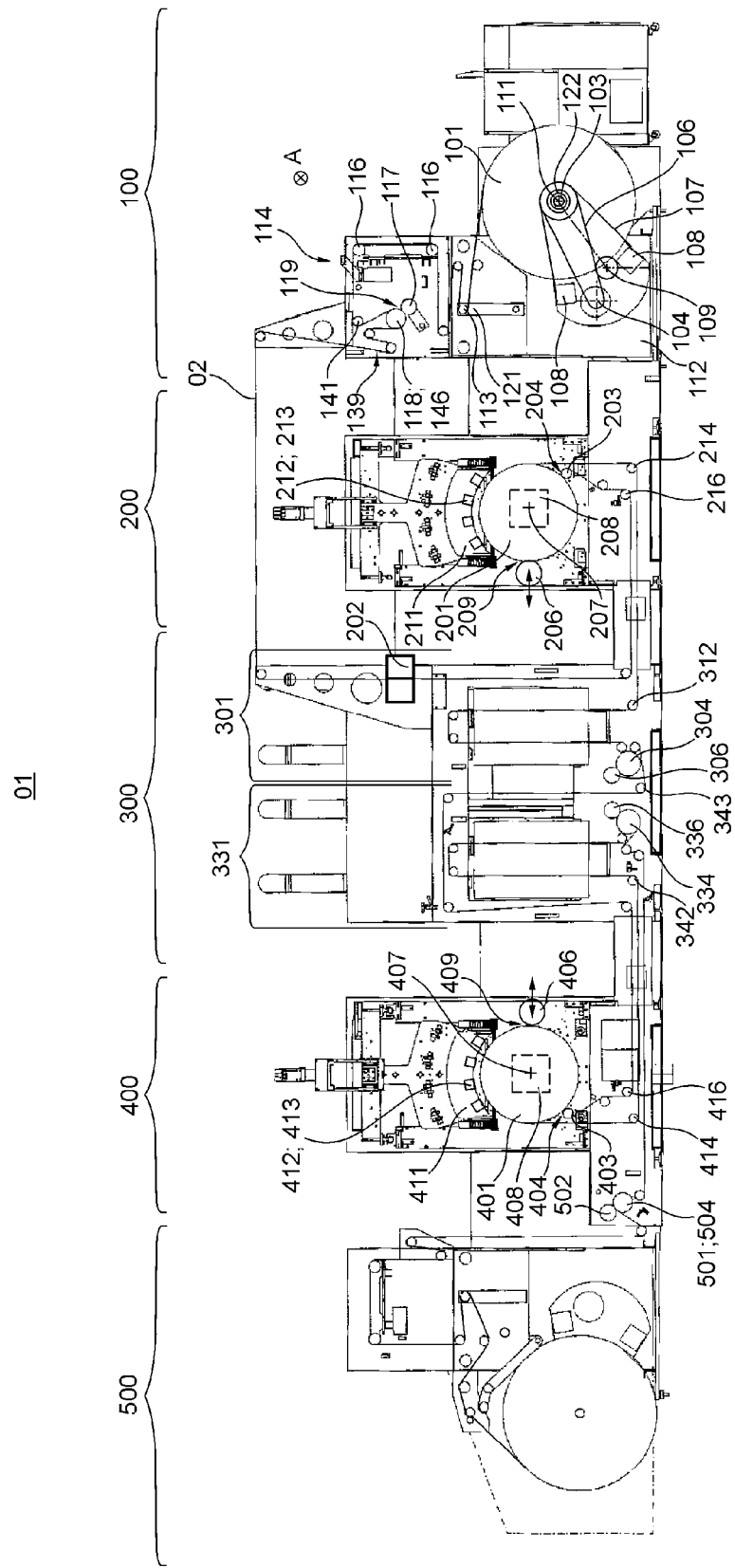
Figure 2:
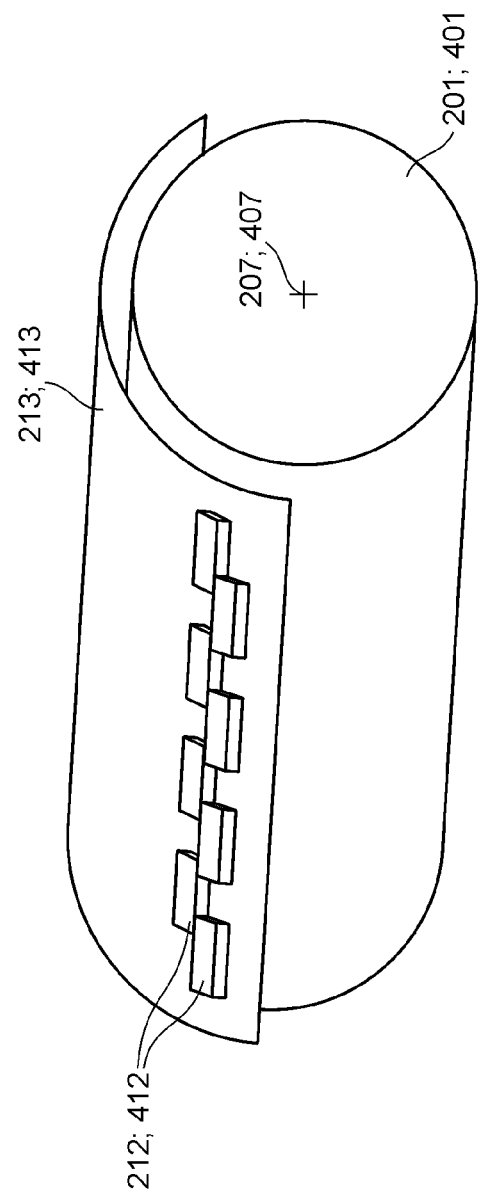
FIG. 2 a schematic representation of a part of a printing unit having a double row of print heads, an application device situated upstream and one downstream, and an air blade.

A printing press 01 comprises at least one printing material source 100, at least one first printing unit 200, preferably at least one means that supports the first drying, i.e. first supplemental drying means 301, e.g. a first dryer 301, preferably at least one second printing unit 400 and preferably at least one second means that supports drying, i.e. supplemental drying means 331, e.g. a second dryer 331, and preferably at least one post-processing device 500.

Printing press 01 is further preferably embodied as inkjet printing press 01. Printing press 01 is preferably embodied as a web-fed printing press 01, and more preferably as a web-fed inkjet printing press 01. Printing press 01 is embodied, for example, as a printing press 01 having a rotating cylinder 201; 401 that guides printing material 02, and in the case of an indirect inkjet printing method is additionally embodied as having e.g. a likewise rotating transfer cylinder or a circulating belt as a transfer means, more particularly as indirect web-fed inkjet printing press 01. In the embodiment presented here, printing press 01 is embodied for direct inkjet printing, i.e. without transfer means. In the case of a web-fed printing press 01, printing material source 100 is embodied as a roll unwinding device 100. In the case of a sheet-fed printing press, printing material source 100 is embodied as a sheet feeder. In printing material source 100, at least one printing material 02 is preferably aligned, preferably with respect to at least with respect to one edge of said printing material 02. In the roll unwinding device 100 of a web-fed printing press 01, at least one web-type printing material 02, that is, a printing material web 02, preferably a paper web 02, is unwound from a roll of printing material 101 and is preferably aligned with respect to its edges in an axial direction A. Axial direction A is preferably a direction A that extends parallel to a rotational axis 111 of a roll of printing material 101 and/or of at least one central cylinder 201; 401. A transport path of the at least one printing material 02 and particularly of printing material web 02 downstream of the at least one printing material source 100 preferably extends through the at least one first printing unit 200, where printing material 02 and particularly printing material web 02 is provided with a printed image, preferably by means of at least one printing ink, at least on one side and in combination with the at least one second printing unit 400, preferably on both sides.

After passing through the at least one first printing unit 200, the transport path of printing material 02 and particularly of printing material web 02 preferably passes through the at least one first dryer 301, where the applied printing ink is dried. Printing ink in the above and in the following is generally understood as a coating medium, in particular as a printing ink containing a polymer, as will be specified in greater detail below. The at least one first dryer 301 is preferably a component of a dryer unit 300. After passing through the at least one first dryer 301 and preferably the at least one second printing unit 400 and/or the at least one second dryer 331, printing material 02 and particularly printing material web 02 is preferably fed to the at least one post-processing device 500, where it is further processed. The at least one post-processing device 500 is embodied, for example, as at least one folding apparatus 500 and/or as a winding apparatus 500 and/or as at least one planar delivery unit 500. In the at least one folding apparatus 500, printing material 02, which has preferably been printed on both sides, is preferably further processed to produce individual printed products.

Along the transport path of printing material 02 and particularly of printing material web 02 through printing press 01, at least the first dryer 301 is preferably arranged downstream of the at least one first printing unit 200, and/or at least the second printing unit 400 is preferably arranged downstream of the at least one first dryer 301, and/or the at least one second dryer 331 is preferably arranged downstream of the at least one second printing unit 400, and/or the at least one post-processing device 500 is preferably arranged downstream of the at least one second dryer 331. This serves to ensure a capability for high quality double-sided printing of printing material 02 and particularly of printing material web 02.

In a preferred embodiment of printing press 01, the press can be operated in at least one operating mode using a printing ink that contains a binder, in particular a binder embodied as or at least comprising a polymer, and/or is or will be operated using such a printing ink which is described below in reference to particularly advantageous examples, and/or can be operated using a chemical and/or energy-based pretreatment and/or posttreatment by means of an application device 217; 218; 417; 418 configured for this purpose, for example, and/or is or will be operated with such a pretreatment and/or posttreatment or such an application device 217; 218; 417; 418, as will be described below in reference to particularly advantageous examples. An application device 217; 218; 417; 418 of this type is preferably provided in the printing material path upstream of at least one supplemental drying means 301; 331; 219; 419, e.g. a dryer 301 and/or an air blade 219; 419.

In one advantageous embodiment, printing press 01, which is preferably operated using a specific printing ink and/or a pretreatment and/or posttreatment of this type, can be and/or is operated in at least one operating mode using a printing material 02, which in the region of its surface to be printed is nonabsorbent or at least is only minimally absorbent and/or hydrophobic (see below), for example not hydrophilic—at least relative to water and/or to a primarily (>50%) aqueous liquid or phase and/or at least at the time of printing—, and/or e.g. has a wetting or contact angle for the primarily aqueous printing ink of less than 90°, for example, in particular of 45.0°, or preferably of less than 5.0°.

In another advantageous embodiment, printing press 01, which is preferably operated using a specific printing ink and/or a pretreatment and/or posttreatment of this type, can be or is operated in at least one operating mode using a newsprint-type printing material 02, which will likewise be described in greater detail below.

Printing press 01, which is operated or can be operated using an above-described printing ink and/or an above-described printing material 02, is embodied as an inkjet printing press 01, as described in general terms above. In advantageous configurations, the press can be embodied and/or enhanced with one or more features of the web-fed printing press 01 described in the following. In addition, in the following, printing material 02 is used in printing press 01 described below in a variant of an embodiment, mentioned above and described e.g. in greater detail below, and/or the printing ink is embodied as a preferably polymer-containing printing ink in one of the embodiments mentioned above and described in greater detail below. In this case, printing material 02 can preferably be embodied as printing material web 02.

In the following a printing press 01 embodied as a web-fed printing press 01 will be described in greater detail. However, corresponding specifics may also be applied to other printing presses 01, for example to sheet-fed printing presses, where such specifics are not incompatible. Rolls of printing material 101, which are preferably used in roll unwinding device 100, preferably each have a core, onto which the web-type printing material 02 for use in web-fed printing press 01 is wound. Printing material web 02 preferably has a width of 700 mm to 2000 mm, but can also have any smaller or preferably greater width. At least one roll of printing material 101 is rotatably arranged in roll unwinding device 100. In a preferred embodiment, roll unwinding device 100 is configured suitably for receiving one roll of printing material 101, and thus has only one storage position for a roll of printing material 101. In another embodiment, roll unwinding device 100 is embodied as roll changer 100 and has storage positions for at least two rolls of printing material 101. Roll changer 100 is preferably embodied to enable a flying roll change, that is, a splicing of a first printing material web 02 of a roll of printing material 101 currently being processed to a second printing material web 02 of a roll of printing material 101 to be subsequently processed, while both the roll of printing material 101 currently being processed and the roll of printing material 101 to be subsequently processed are in rotation.

A working width of printing press 01 is a dimension that preferably extends orthogonally to the provided transport path of printing material 02 through the at least one first printing unit 200, more preferably in axial direction A. The working width of printing press 01 preferably corresponds to a maximum allowable width of a printing material for processing in printing press 01, that is, a maximum printing material width that can be processed in printing press 01.

Roll unwinding device 100 preferably has at least one roll holding device 103, embodied as a chucking device 103 and/or as a clamping device 103, for example, for each storage position. The at least one roll holding device 103 preferably represents at least one first motor-driven rotational body 103. The at least one roll holding device 103 rotatably secures at least one roll of printing material 101. The at least one roll holding device 103 preferably has at least one drive motor 104.

Along the transport path of printing material web 02 downstream of roll holding device 103, roll unwinding device 100 preferably has a dancer roller 113, preferably arranged to swivel outward on a dancer lever 121, and/or a first web edge aligner 114, and/or an infeed unit 139, which has an infeed nip 119 formed by a traction roller 118 and a tractive impression roller 117, and has a first measurement device 141, embodied as a first measuring roller 141, particularly as a nip measuring roller 141. Said traction roller 118 preferably has its own drive motor 146, embodied as a tractive drive motor 146, which is preferably connected to a machine controller. Traction roller 118 preferably represents at least one second motor-driven rotational body 118. By means of dancer roller 113, a web tension can be adjusted and held within limits, and/or the web tension preferably is held within limits. Roll unwinding device 100 optionally has a splicing and cutting device, by means of which a roll change can be carried out on a flying basis, i.e. without stopping the printing material web 02.

Infeed unit 139 is preferably arranged downstream of the first web edge aligner 114. The at least one traction roller 118 is preferably provided as a component of infeed unit 139, and preferably cooperates with tractive impression roller 117 to form infeed nip 119. Infeed nip 119 serves to control a web tension and/or to transport printing material 02. The web tension can preferably be measured by means of the at least one first measuring device 141, embodied as first measuring roller 141. The at least one first measuring device 141, embodied as first measuring roller 141, is preferably arranged upstream of infeed nip 119 in the direction of transport of printing material web 02.

A first printing unit 200 is arranged downstream of roll unwinding device 100 along the transport path of printing material 02. First printing unit 200 has at least one first central printing cylinder 201, or central cylinder 201. In the following, when a central cylinder 201 is mentioned, a central printing cylinder 201 is always meant. The at least one first central cylinder 201 preferably represents at least one third motor-driven rotational body 201. During printing operation, printing material web 02 wraps at least partially around first central cylinder 201. A wrap angle in this case is preferably at least 180° and more preferably at least 270°. The wrap angle is the angle, measured in the circumferential direction, of the circumferential cylinder surface of first central cylinder 201 along which printing material 02, and particularly printing material web 02, is in contact with first central cylinder 201. Therefore, during printing operation, as viewed in the circumferential direction, preferably at least 50% and more preferably at least 75% of the circumferential cylinder surface of first central cylinder 201 is in contact with printing material web 02. This means that a partial surface area of a circumferential cylinder surface of the at least one first central cylinder 201, provided as the contact surface between the at least one first central cylinder 201 and printing material 02, preferably embodied as printing material web 02, has the wrap angle around the at least one first central cylinder 201 that preferably measures at least 180° and more preferably at least 270°.

Along the transport path of printing material web 02, upstream of first central cylinder 201 of first printing unit 200, at least one second measuring device 216, preferably embodied as second measuring roller 216, is preferably provided for measuring web tension.

Although this is not absolutely essential when the above-mentioned printing ink is used, or may not even be provided in printing press 01 for reasons of cost, in one variant, in an even more variable embodiment of printing press 01 with respect to the printing materials 02 that may be used, a first printing material preparation device 202 or web preparation device 202 acting on printing material web 02 and/or aligned toward the provided transport path of printing material web 02 can be provided along the transport path of printing material web 02, upstream of first central cylinder 201 of first printing unit 200, in particular upstream of first printing unit 200. The first printing material preparation device 202 provided in this embodiment is assigned at least to a first side and preferably to both sides of the printing material web 02 and is particularly aligned so as to act and/or be capable of acting at least on this first side of the printing material web 02 and preferably on both sides of the printing material web 02. However, in an embodiment of printing press 01 that is advantageous due to its lower cost, no additional printing material preparation device 202; 402 is provided and/or at least in the first operating mode, an optionally provided printing material preparation device 202; 402 is inactive.

Infeed nip 119 formed by traction roller 118 and tractive impression roller 117 is preferably arranged between first web edge aligner 114 and the at least one first central cylinder 201 along the transport path of printing material web 02.

In a preferred embodiment, the at least one first printing material preparation device 202 provided in one embodiment of printing press 01 is arranged along the transport path of printing material web 02 downstream of infeed nip 119 and upstream of first central cylinder 201, in particular upstream of first printing unit 200, acting on printing material web 02 and/or aligned toward the transport path of printing material web 02. The at least one first printing material preparation device 202 is preferably embodied as at least one printing material cleaning device 202 or web cleaning device 202. Alternatively or additionally, the at least one printing material preparation device 202 is embodied as at least one coating device 202 in particular for water-based coating medium. Such a coating can serve, for example, as a base coat with a so-called primer. Alternatively or additionally, the at least one printing material preparation device 202 can be embodied as at least one corona device 202 and/or discharge device 202 for the corona treatment of printing material 02. Printing material preparation device 202, when provided, is located, e.g. in the printing material path upstream of printing unit 200; 400 and/or in a different location from an application device 218; 418, which is optionally provided and will be described below in greater detail, which is and situated directly upstream of the printing element, for example, in the printing material path.

A roller 203, embodied as a first turning roller 203 of first printing unit 200, is preferably arranged with its rotational axis parallel to the first central cylinder 201. This first turning roller 203 is preferably arranged spaced from first central cylinder 201. In particular, a first gap 204, which is greater than the thickness of printing material web 02, is preferably provided between first turning roller 203 and first central cylinder 201. The thickness of printing material web 02 in this context is understood as the smallest dimension of printing material web 02. Printing material web 02 preferably wraps around part of the first turning roller 203 and is turned by said roller such that the transport path of printing material web 02 in first gap 204 extends both tangentially to first turning roller 203 and tangentially to first central cylinder 201. The circumferential surface of turning roller 203 in this case is preferably made of a relatively inelastic material, more preferably of a metal, even more preferably of steel or aluminum.

At least one first cylinder 206, e.g. embodied as first impression cylinder 206, is preferably provided in first printing unit 200. First impression cylinder 206 preferably has a circumferential surface made of an elastic material, for example an elastomer. First impression cylinder 206 is preferably arranged such that it can be thrown on and/or thrown off of first central cylinder 201 by means of an actuating drive. In a state in which it is thrown onto first central cylinder 201, first impression cylinder 206, together with first central cylinder 201, preferably forms a first impression nip 209. During printing operation, printing material web 02 preferably passes through first impression nip 209. By means of first turning roller 203 and/or preferably by means of first impression cylinder 206, printing material web 02 is preferably placed in planar contact, and more preferably in a specific and known position, against first central cylinder 201. Preferably, apart from first impression cylinder 206, and/or optionally additional impression cylinders at most, no additional rotational elements, in particular no additional roller and no additional cylinder, is in contact with the at least one first central cylinder 201. The rotational axis of first impression cylinder 206 is preferably arranged below rotational axis 207 of first central cylinder 201.

First central cylinder 201 preferably has its own first drive motor 208, assigned to first central cylinder 201, which drive motor is preferably embodied as an electric motor 208 and is more preferably embodied as a direct drive 208 and/or an independent drive 208 of first central cylinder 201. A direct drive 208 in this case is understood as a drive motor 208 which is connected to the at least one first central cylinder 201 so as to transmit torque or be capable of transmitting torque, without interconnection of additional rotational elements that are in contact with printing material 02. An independent drive 208 in this context is understood as a drive motor 208 which is embodied as the drive motor 208 exclusively of the at least one first central cylinder 201. First drive motor 208 of first central cylinder 201 preferably has at least one permanent magnet, which further preferably is part of a rotor of first drive motor 208 of first central cylinder 201.

On first drive motor 208 of first central cylinder 201 and/or on first central cylinder 201 itself, a first rotational angle sensor is preferably provided, which is embodied to measure and/or be capable of measuring an angular position of first drive motor 208 and/or of first central cylinder 201 itself, and to transmit and/or be capable of transmitting said measurement to a higher level machine controller. The first rotational angle sensor is embodied, for example, as a rotation encoder or absolute value encoder. A rotational angle sensor of this type can be used to determine in absolute terms the angular position of first drive motor 208 and/or preferably the angular position of first central cylinder 201, preferably by means of the higher level machine controller. Additionally or alternatively, first drive motor 208 of first central cylinder 201 is connected in terms of circuitry to the machine controller such that the machine controller is informed at all times regarding the angular position of first drive motor 208 and therefore at the same time regarding the angular position of first central cylinder 201, on the basis of target data relating to the angular position of first drive motor 208, predefined by the machine controller to first drive motor 208 of first central cylinder 201. In particular, a region of the machine controller that specifies the rotational angle position or angular position of first central cylinder 201 and/or of first drive motor 201 is preferably connected directly, in particular without an interconnected sensor, to a region of the machine controller that controls at least one print head 212 of first printing unit 200.

At least one first printing element 211 is arranged inside first printing unit 200. The at least one first printing element 211 is preferably arranged downstream of first impression cylinder 206 in the direction of rotation of first central cylinder 201 and therefore along the transport path of printing material web 02, preferably so as to act and/or be capable of acting on, and/or as aligned and/or capable of being aligned toward the at least one first central cylinder 201. The at least one first printing element 211 is embodied as a first inkjet printing element 211, and is also referred to as first inkjet printing element 211. First printing element 211 preferably has at least one nozzle bar 213 and preferably a plurality of nozzle bars 213. The at least one first printing element 211, and therefore the at least one first printing unit 200, preferably has the at least one first print head 212, which is embodied as inkjet print head 212. Each at least one nozzle bar 213 preferably has at least one print head 212 and preferably a plurality of print heads 212. Each print head 212 preferably has a plurality of nozzles, from which droplets of printing ink are ejected and/or can be ejected. A nozzle bar 213 in this case is a component that preferably extends across at least 80% and more preferably at least 100% of the working width of printing press 01 and serves as a support for the at least one print head 212. The axial length of the body of the at least one first central cylinder 201 is preferably at least as great as the working width of printing press 01. A single nozzle bar is or a plurality of nozzle bars 213 are provided per printing element 211. Each nozzle is preferably assigned a clearly defined target region with respect to direction A of the width of printing material web 02 and preferably with respect to direction A particularly of rotational axis 207 of the at least one first central cylinder 201. Each target region of a nozzle, particularly with respect to the circumferential direction of the at least one first central cylinder 201, is preferably clearly defined, at least during printing operation. A target region of a nozzle is particularly the spatial region, particularly substantially rectilinear, that extends outward from said nozzle in an ejecting direction of said nozzle.

The at least one first nozzle bar 213 preferably extends orthogonally to the transport path of printing material 02 across the working width of printing press 01. The at least one nozzle bar 213 preferably has at least one row of nozzles. The at least one row of nozzles, as viewed in axial direction A, preferably has nozzle openings spaced evenly across the entire working width of printing press 01 and/or across the entire width of the body of the at least one first central cylinder 201. In one embodiment, a single continuous print head 212 is provided for this purpose, which extends in axial direction A across the entire working width of printing press 01 and/or across the entire width of the body of the at least one first central cylinder 201. In this case, the at least one row of nozzles is preferably embodied as at least one linear row of individual nozzles, extending across the entire width of printing material web 02 in axial direction A. In another preferred embodiment, a plurality of print heads 212 are arranged side by side in axial direction A on the at least one nozzle bar 213. Since such individual print heads 212 usually are not equipped with nozzles up to the edges of their housing, preferably at least two and more preferably precisely two rows of print heads 212, extending in axial direction A, are preferably arranged offset from one another in the circumferential direction of first central cylinder 201, preferably such that successive print heads 212 in axial direction A are preferably assigned alternatingly to one of the at least two rows of print heads 212, preferably alternating constantly between a first and a second of two rows of print heads 212. Two such rows of print heads 212 form a double row of print heads 212. The at least one row of nozzles is preferably not embodied as a single linear row of nozzles, and instead results as the sum of a plurality of individual rows of nozzles, more preferably two, arranged offset from one another in the circumferential direction.

If a print head 212 has a plurality of nozzles, all the target regions of the nozzles of said print head 212 together form an operating region of said print head 212. Operating regions of print heads 212 of a nozzle bar 213 and particularly of a double row of print heads 212 border one another as viewed in axial direction A and/or overlap as viewed in axial direction A. This serves to ensure that target regions of nozzles of the at least one nozzle bar 213 and/or particularly of each double row of print heads 212 are spaced at regular and preferably periodic distances, as viewed in axial direction A, even if print head 212 is not continuous in axial direction A. In any case, an entire operating region of the at least one nozzle bar 213 preferably extends across at least 90% and more preferably across 100% of the working width of printing press 01 and/or across the entire width of the body of the at least one first central cylinder 201 in axial direction A. On one or on both sides with respect to axial direction A, a narrow region of printing material web 02 and/or of the body of first central cylinder 201 may be provided which is not assigned to the operating region of nozzle bar 213. An entire operating region of the at least one nozzle bar 213 is preferably composed of all the operating regions of the print heads 212 of said at least one nozzle bar 213 and is preferably composed of all the target regions of nozzles of said print heads 212 of said at least one nozzle bar 213. An entire operating region of a double row of print heads 212, as viewed in axial direction A, preferably corresponds to the operating region of the at least one nozzle bar 213.

The at least one nozzle bar 213 preferably has a plurality of rows of nozzles in the circumferential direction with respect to the at least one first central cylinder 201. Each print head 212 preferably has a plurality of nozzles, which are further preferably arranged in a matrix of a plurality of lines in axial direction A and/or a plurality of columns, preferably in the circumferential direction of the at least one first central cylinder 201, with columns of this type more preferably being arranged extending at an angle relative to the circumferential direction, for example in order to increase the resolution of a printed image. In a direction orthogonally to axial direction A, particularly in the transport direction along the transport path of printing material 02 and/or in the circumferential direction with respect to the at least one central cylinder 201, preferably a plurality of rows of print heads 212, more preferably four double rows, and more preferably still eight double rows of print heads 212 are arranged in succession. Further preferably, at least during printing operation, a plurality of rows of print heads 212, more preferably four double rows, and more preferably still eight double rows of print heads 212 are arranged in succession in the circumferential direction with respect to the at least one first central cylinder 201, aligned toward the at least one first central cylinder 201.

Thus at least during printing operation, print heads 212 are preferably aligned such that the nozzles of each print head 212 point substantially in the radial direction toward the circumferential cylinder surface of the at least one first central cylinder 201. Deviations of radial directions within a tolerance range of preferably 10° at most and more preferably 5° at most are considered substantially radial directions. This means that the at least one print head 212, aligned toward the circumferential surface of the at least one first central cylinder 201, is aligned with respect to rotational axis 207 of the at least one first central cylinder 201 in a radial direction toward the circumferential surface of the at least one first central cylinder 201. Said radial direction is a radial direction with respect to rotational axis 207 of the at least one first central cylinder 201. A printing ink of a specific color, for example one each of the colors black, cyan, yellow and magenta, or a varnish, for example a clear varnish, preferably is and/or can be assigned to each double row of print heads 212. The corresponding inkjet printing element 211 is preferably embodied as a four-color printing element 211, and enables single-sided, four-color printing of printing material web 02. It is also possible to use one printing element 211 to print with fewer or with more different colors, for example additional special colors. In that case, correspondingly more or fewer print heads 212 and/or double rows of print heads 212 are preferably arranged within said corresponding printing element 211. In one embodiment, at least during printing operation, a plurality of rows of print heads 212, more preferably four double rows and more preferably still eight double rows of print heads 212 are arranged in succession, aligned toward at least one surface of at least one transfer means or transfer element, for example at least one transfer cylinder and/or at least one transfer tape.

The at least one print head 212 acts to generate droplets of printing ink, preferably using the drop-on-demand method, in which droplets of printing ink are produced selectively as needed.

At least one piezoelectric element is preferably used per nozzle, which is capable of reducing a volume filled with printing ink by a certain percentage at high speed when a voltage is applied. This causes printing ink to be displaced and ejected through a nozzle connected to the volume that is filled with printing ink, forming at least one droplet of printing ink. By applying different voltages to the piezoelectric element, the actuating path of the piezoelectric element and as a result the reduction in the volume and thus the size of the printing ink droplets can be influenced. This allows color gradations to be achieved in the resulting printed image, without altering the number of droplets used to produce the printed image (amplitude modulation). It is also possible to use at least one heating element per nozzle, which generates a gas bubble at high speed in a volume filled with printing ink by vaporizing printing ink. The additional volume of the gas bubble displaces printing ink, which is in turn ejected through the corresponding nozzle, forming at least one droplet of printing ink.

In the drop-on-demand method, droplet deflection once a droplet has been ejected from the corresponding nozzle is not necessary, because a target position of the respective printing ink droplet on the moving printing material web 02 can be defined in relation to the circumferential direction of the at least one first central cylinder 201 based solely on an ejection time of the respective printing ink droplet and a rotational speed of first central cylinder 201 and/or based on the rotational position of first central cylinder 201. Actuating each nozzle individually allows printing ink droplets to be transferred only at selected times and at selected locations from the at least one print head 212 onto printing material web 02. This is carried out based on the rotational speed and/or the rotational angle position of the at least one first central cylinder 201, the distance between the respective nozzle and printing material web 02 and the position of the target region of the respective nozzle in relation to the circumferential angle. This results in a desired printed image, which is produced based on the actuation of all nozzles.

Ink droplets are preferably ejected from the at least one nozzle of the at least one print head 212 based on the angular position of first drive motor 208, as predefined by the machine controller. The target data relating to the angular position of first drive motor 208, as specified by the machine controller to first drive motor 208, are preferably incorporated in real time into a calculation of data for actuating the nozzles of the at least one print head 212. A comparison with actual data regarding the angular position of first drive motor 208 is preferably not necessary, and preferably is not carried out. Thus a precise and constant positioning of printing material web 02 relative to the at least one first central cylinder 201 is critical for producing a printed image that maintains color-to-color registration and/or is true to register.

The nozzles of the at least one print head 212 are arranged in such a way that the distance between the nozzles and printing material web 02 arranged on the circumferential cylinder surface of the at least one first central cylinder 201 is preferably between 0.5 mm and 5 mm and more preferably between 1 mm and 1.5 mm. The high angular resolution and/or high scanning frequency of the rotational angle sensor and/or the high precision of the target data relating to the angular position of first drive motor 208 of first central cylinder 201, as predefined by the machine controller and processed by first drive motor 208 of first central cylinder 201, enable a highly precise position determination and/or knowledge of the location of printing material web 02 in relation to the nozzles and the target regions thereof. The droplet flight time between the nozzles and printing material web 02 is known, for example, from a learning process and/or from the known distance between the nozzles and printing material web 02 combined with a known droplet speed. The rotational angle position of the at least one first central cylinder 201 and/or of the first drive 208 of the at least one first central cylinder 201, the rotational speed of the at least one first central cylinder 201 and the droplet flight time are used to determine the ideal time for ejection of a respective droplet so that printing material web 02 will be printed in a manner that maintains color-to-color registration and/or is true to register.

At least one sensor embodied as a first printed image sensor is preferably provided, more preferably at a point along the transport path of printing material web 02 downstream of first printing element 211. The at least one first printed image sensor is embodied, for example, as a first line camera or as a first surface camera. The at least one first printed image sensor is embodied, for example, as at least one CCD sensor and/or as at least one CMOS sensor. The actuation of all the print heads 212 and/or double rows of print heads 212 of first printing element 211, arranged and/or acting in succession in the circumferential direction of the at least one first central cylinder 201, is preferably monitored and controlled by means of this at least one first printed image sensor and a corresponding analysis unit, for example the higher level machine controller. In a first embodiment of the at least one printed image sensor, only a first printed image sensor is provided, the sensor field of which encompasses the entire width of the transport path of printing material web 02. In a second embodiment of the at least one printed image sensor, only a first printed image sensor is provided, however it is embodied as movable in direction A, orthogonally to the direction of the transport path of printing material web 02. In a third embodiment of the at least one printed image sensor, a plurality of printed image sensors are provided, the respective sensor fields of which each encompass different regions of the transport path of printing material web 02. These regions are preferably arranged offset from one another in direction A, orthogonally to the direction of the transport path of printing material web 02. The total of the sensor fields of the plurality of printed image sensors preferably makes up one entire width of the transport path of printing material web 02.

The positioning of pixels formed by printing ink droplets, each of which emerges from a respective first print head 212, is preferably compared with the positioning of pixels formed by printing ink droplets, each of which emerges from a respective second print head 212 situated downstream of the respective first print head 212 in the circumferential direction of the at least one first central cylinder 201. This is preferably carried out regardless of whether said respective first and second print heads 212, which are arranged and/or act in succession in the circumferential direction of the at least one first central cylinder 201, are processing the same or a different printing ink. The correlation of the positions of the printed images coming from different print heads 212 is monitored. If the same printing inks are being used, the true-to-register merging of partial images is monitored. If different printing inks are being used, the registration or color-to-color registration is monitored. Quality control of the printed image is also preferably carried out based on the measured values of the at least one printed image sensor.

During regular printing operation, all of print heads 212 are arranged as stationary. This serves to ensure a consistently true-to-registration and/or true-to-register alignment of all the nozzles. Various situations are conceivable in which a movement of the print heads 212 might be necessary. A first such situation is a flying roll change or generally a roll change that involves a splicing process. In such a process, one printing material web 02 is connected by means of an adhesive strip to another printing material web 02. This results in a spliced region, which must pass through the entire transport path of the printing material web 02. The thickness, that is, the smallest dimension of said spliced region is greater than the thickness of printing material web 02. The spliced region has essentially the same thickness as two printing material webs 02 plus the adhesive strip. This can cause difficulties when the spliced region passes through the gap between the nozzles of print heads 212 and the circumferential cylinder surface of the at least one first central cylinder 201. Thus the at least one nozzle bar 213 can be moved in at least one direction relative to rotational axis 207 of the at least one first central cylinder 201. This allows the spacing to be increased sufficiently; however, it must be decreased again accordingly afterward. A second such situation arises, for example, during maintenance and/or cleaning of at least one of print heads 212. Print heads 212 are preferably secured individually to the at least one nozzle bar 213 and can be individually removed from the at least one nozzle bar 213. This allows individual print heads 212 to be maintained and/or cleaned and/or replaced.

When a plurality of nozzle bars 213 that can be moved relative to one another is provided, minimal misalignments of the nozzle bars 213 relative to one another can occur during the return of at least one nozzle bar 213 to its printing position. Thus it can be necessary to perform an alignment, specifically of all the print heads 212 of one nozzle bar 213 in relation to the print heads 212 of other nozzle bars 213. When a new print head 212 and/or a print head to be replaced is installed on the at least one nozzle bar 213 on which at least one other print head 212 is already installed, this will not necessarily produce a precisely matched alignment of this new print head 212 and/or print head to be replaced with the at least one print head 212 that is already installed, specifically in the circumferential direction and/or in axial direction A with respect to the at least one first central cylinder 201; at best, such an alignment will occur accidentally. Thus it may also be necessary to perform an alignment in this case, specifically of an individual print head 212 in relation to other print heads 212 of the same nozzle bar 213 and/or other nozzle bars 213.

At least one sensor detects the location of the target region of at least one new and/or replaced print head 212 relative to the location of the target region of at least one previously mounted print head 212. The installed position of the at least one new and/or replaced print head 212 can be adjusted in the circumferential direction with respect to the at least one first central cylinder 201 by actuating the nozzles of said print head 212, preferably in a manner similar to the adjustment of print heads 212 of different double rows of print heads 212 already described. The installed position of the at least one new and/or replaced print head 212 is adjusted in axial direction A with respect to the at least one first central cylinder 201 by means of at least one adjustment mechanism. Preferably, each of a plurality of print heads 212 has its own adjustment mechanism, and more preferably, each print head 212 has its own adjustment mechanism.

Printing press 01 has at least one system for supplying coating medium, in particular the printing inks, in particular printing ink supply system. Preferably, a plurality of print heads 212, for example a plurality of print heads 212 of a common nozzle bar 213, in particular a plurality of or more preferably still all of print heads 212 in each double row of print heads has a common system for supplying coating medium or printing inks. This common supply system preferably has at least one main reservoir. At least one first fluid line or ink line per print head 212 is connected to the at least one main reservoir in each case. Preferably, the at least one main reservoir is connected via at least one supply line and at least one drain line to at least one and preferably the same at least one intermediate reservoir.

The main reservoir preferably has a fill level which is constant with only slight deviations that lie within a narrow tolerance range, at least during printing operation and more preferably permanently. This constant fill level can be achieved, for example, by means of a preferably passive overflow drain and an infeed of printing ink. The at least one main reservoir and/or the at least one drain line preferably has at least one preferably passive overflow drain, the drain side of which preferably is and/or can be connected to the at least one intermediate reservoir. At least one valve, preferably embodied as a flow check valve, is preferably arranged within the at least one supply line and/or within the at least one drain line. At least one first liquid pump is preferably provided in the at least one supply line. A controlled and/or regulated normal pressure preferably prevails in the main reservoir, and is further preferably controlled and/or regulated relative to an ambient pressure. A negative pressure in relation to ambient pressure preferably prevails in the main reservoir. Printing ink is preferably pumped by at least one pump from the intermediate reservoir into the main reservoir. At least one volume provided as a first gas-filled space is preferably arranged in the at least one main reservoir. The at least one first gas-filled space is preferably connected via at least one first gas line to at least one first gas pump. The same pressure as in the at least one first gas-filled space of the at least one main reservoir is preferably present in a second gas-filled space of the intermediate reservoir. The at least one intermediate reservoir is preferably connected to at least one buffer reservoir, more preferably via at least one suction line. Ambient pressure preferably prevails in the buffer reservoir. Printing ink is preferably conveyed out of the buffer reservoir into the intermediate reservoir by way of the relative negative pressure.

The intermediate reservoir and/or the normal reservoir can form an ink reservoir in which an aforementioned, preferably polymer-containing printing ink is held in reserve as ink.

A plurality of print heads 212, for example a plurality of print heads 212 of a common nozzle bar 213, in particular a plurality of print heads 212 or more preferably all the print heads of each double row of print heads 212 preferably have a common voltage supply system. At least one common power supply line for the voltage supply preferably extends within the respective at least one nozzle bar over at least 50%, more preferably at least 75% and even more preferably at least 90% of the width of the operating region of the respective at least one nozzle bar 213 in axial direction A and/or of the working width of printing press 01. Each print head 212 of said respective at least one nozzle bar 213 preferably has at least one dedicated power line, which is connected to said common power supply line for the voltage supply. Each print head 212 of said respective at least one nozzle bar 213 preferably has at least one dedicated data line, which is connected to a computer unit which is arranged outside of the operating region of the respective at least one nozzle bar 213 with respect to axial direction A, and/or outside of each transport path provided for printing material 02 in printing press 01 with respect to axial direction A. Thus at least one data line per print head 212 of said at least one nozzle bar 213 extend parallel to one another, at least along a section of nozzle bar 213 that extends in axial direction A.

At least one nozzle cleaning device is preferably provided, which has at least one row of cleaning nozzles and/or brushes and/or scrapers.

Once printing material web 02 has passed the at least one first printing unit 200, printing material web 02 is transported further along its transport path and is preferably fed to the at least one first dryer 301 of the at least one dryer unit 300. The first side of printing material web 02, which has been printed by the at least one first printing unit 200, preferably is not in contact with any component of web-fed printing press 01 between a last point of contact of printing material web 02 with the at least one first central cylinder 201 of the at least one first printing unit 200 and an area of action of the at least one first dryer 301. The second side of printing material web 02, which particularly has not been printed by first printing unit 200 and which is in contact with the at least one first central cylinder 201 of the at least one first printing unit 200, is preferably in contact with at least one turning roller 214 of the at least one first printing unit 200 and/or with at least one turning roller 312 of the at least one first dryer 301, between the last point of contact of printing material web 02 with first central cylinder 201 of the at least one first printing unit 200 and the area of action of the at least one first dryer 301. At least one third measuring device 214, more preferably embodied as a third measuring roller 214, is preferably provided. This third measuring device 214 is used to measure web tension. Further preferably, the at least one turning roller 214 of first printing unit 200 is identical to the third measuring device 214 embodied as the third measuring roller 214.

The at least one first dryer 301 is preferably embodied as an infrared radiation dryer 301. The at least one first dryer 301 preferably has at least one radiation source 302, preferably embodied as an infrared radiation source 302. A radiation source 302, preferably an infrared radiation source 302, in this case is a device by means of which electrical energy is and/or can be purposely converted to radiation, preferably infrared radiation, and is and/or can be directed toward printing material web 02. The at least one radiation source 302 preferably has a defined area of action. The area of action of a radiation source 302 is particularly the area that contains every point that can be connected, particularly in a straight line and without interruption, directly or via reflectors to the radiation source 302. The area of action of the at least one first dryer 301 is made up of the areas of action of all of radiation sources 302 of the at least one first dryer 301. The area of action of the at least one first dryer 301 preferably points from the at least one radiation source 302 to a part of the transport path of printing material web 02 that is closest to the at least one radiation source 302. Air is introduced into the interior of the at least one first dryer 301 through at least one ventilation opening. Inside first dryer 301, water and/or solvent from the printing inks, which are to be removed from printing material web 02, are removed by means of the infrared radiation and are absorbed into the introduced air. This air is then removed from the at least one first dryer 301 through at least one venting opening.

In a preferred embodiment, the provided transport path for printing material 02 through the at least one first dryer 301 has at least two sub-sections, each extending in directions that have vertical components, more preferably greater vertical components than any optionally provided horizontal components. The provided transport path of the printing material along the one sub-section preferably extends with at least one component in an upward vertical direction. The provided transport path of the printing material along the other sub-section preferably extends with at least one component in a downward vertical direction. The one sub-section and the other sub-section of the provided transport path are preferably connected to one another by means of at least one provided connecting section of the provided transport path. The at least one connecting section preferably extends in a direction having a horizontal component, more preferably having a greater horizontal component than an optionally provided vertical component. As a result, the at least one dryer 301 can preferably be particularly compact in configuration.

At least one first cooling unit 303 is preferably arranged downstream of the area of action of the at least one radiation source 302 of the at least one first dryer 301 in the direction of transport of printing material web 02. The at least one first cooling unit 303 preferably comprises at least one first cooling roller 304 and preferably a first cooling pressure roller 306, which can be and/or is thrown onto the at least one first cooling roller 304, and preferably comprises at least one turning roller 307; 308 that can be and/or is thrown onto the at least one first cooling roller 304. A first drive motor 311, embodied as a first cooling roller drive motor 311 and assigned to the at least one first cooling roller 304, and the first cooling pressure roller 306 are preferably part of a web tension adjusting unit, that is, they are arranged so as to adjust the web tension and for this purpose are preferably connected at least partially and/or intermittently to the higher level machine controller. The at least one first cooling roller 304 preferably represents at least one fourth motor-driven rotational body 304. Printing material web 02 wraps around and contacts, preferably along its transport path, the at least one first cooling roller 304 with a wrap angle of preferably at least 180° and more preferably at least 270°. The first cooling pressure roller 306 and the at least one first cooling roller 304 together preferably form a first cooling nip 309, in which printing material web 02 is preferably arranged and/or through which printing material web 02 preferably passes. Printing material web 02 is thereby pressed by cooling pressure roller 306 against the at least one first cooling roller 304. The at least one first cooling roller 304 of the at least one first cooling unit 303 is preferably embodied as a cooling roller 304 through which a coolant flows.

Along the transport path of printing material web 02, downstream of the at least one first cooling unit 303, at least one second printing unit 400 is preferably arranged. Along the transport path of printing material web 02, preferably immediately upstream of the at least one second printing unit 400 and preferably downstream of the at least one first dryer 301, and particularly downstream of the at least one first printing unit 200, at least one second web edge aligner, which can preferably be controlled and/or regulated manually or automatically, is preferably provided. The at least one second printing unit 400 is similar in configuration to first printing unit 200. In particular, second printing unit 400 has a second central printing cylinder 401, or a central cylinder 401, around which printing material 02 wraps during printing operation, likewise with a wrap angle of preferably at least 180° and more preferably at least 270°. Second central cylinder 401 preferably represents a fifth motor-driven rotational body 401. The rotational direction of second central cylinder 401 of second printing unit 400 is preferably opposite the rotational direction of the at least one first central cylinder 201. Along the transport path of printing material web 02, upstream of second central cylinder 401 of second printing unit 400, in particular upstream of second printing unit 400, in a variant also described above in connection with the first printing material cleaning device 202, a second printing material cleaning device 402 or web cleaning device 402 can preferably arranged, as an alternative or additionally, so as to act on printing material web 02. However, if an aforementioned printing ink is used, this cleaning device can likewise be dispensed with entirely.

The transport path of printing material web 02 through the at least one second printing unit 400 extends similarly to the transport path through the at least one first printing unit 200. In particular, printing material web 02 preferably wraps around part of a second turning roller 403 and is turned by said roller such that the transport path of printing material web 02 in the second gap 404 extends both tangentially to second turning roller 403 and tangentially to second central cylinder 401. At least one cylinder 406, embodied as a second impression cylinder 406, is preferably arranged in second printing unit 400. Second impression cylinder 406 is preferably similar in configuration and arrangement to first impression cylinder 206, particularly in terms of its movability and in terms of a second impression nip 409. Second central cylinder 401 is preferably similar in arrangement and configuration to first central cylinder 201, particularly with respect to a second drive motor 408 of second central cylinder 401 and with respect to a corresponding, preferably provided second rotational angle sensor, which is embodied to measure and/or be capable of measuring the angular position of second drive motor 408 and/or of second central cylinder 401 itself and to transmit and/or be capable of transmitting this measurement to the higher level machine controller.

Within second printing unit 400, at least one second printing element 411, embodied as an inkjet printing element 411 or ink-jet printing element 411, is preferably arranged downstream of second impression cylinder 406 in the direction of rotation of second central cylinder 401, and therefore along the transport path of printing material web 02, aligned toward second central cylinder 401. The at least one second printing element 411 of the at least one second printing unit 400 is preferably identical to the at least one first printing element 211 of the at least one first printing unit 200, particularly with respect to at least one nozzle bar 413, at least one print head 412 embodied as an inkjet print head 412 and the arrangement thereof in double rows, the implementation and resolution of the printing process, the arrangement, alignment and actuation of the nozzles and the movability and adjustability of the at least one nozzle bar 413 and the at least one print head 412 by means of at least one adjustment mechanism having a corresponding electric motor. A similar protective cover and/or cleaning device is also preferably provided.

The proper alignment of the print heads 412 of the at least one second printing unit 400 is also preferably monitored by at least one sensor detecting a printed image and the machine controller analyzing said printed image. This at least one sensor is preferably at least one second printed image sensor, which is similar in embodiment to the at least one first printed image sensor. The at least one second printing element 411 is preferably embodied as a four-color printing element 411.

At least one second dryer 331 is arranged downstream of the at least one second printing unit 400 with respect to the transport path of printing material web 02. Once printing material web 02 has passed the at least one second printing unit 400, printing material web 02 is transported further along its transport path and is preferably fed to the at least one second dryer 331 of the at least one dryer unit 300. The at least one second dryer 331 is preferably similar in configuration to the at least one first dryer 301. The at least one first dryer 301 and the at least one second dryer 331 are components of the at least one dryer unit 300. The second side of printing material web 02, which has been printed by the at least one second printing unit 400, is preferably not in contact with any component of web-fed printing press 01 between a last point of contact of printing material web 02 with second central cylinder 401 of the at least one second printing unit 400 and an area of action of the at least one second dryer 301. At least one turning roller 414 is preferably provided in second printing unit 400. Said at least one turning roller 414 is preferably embodied as a fifth measuring unit 414, in particular fifth measuring roller 414.

The configuration of the at least one second dryer 331 is similar to the configuration of the at least one first dryer 301, particularly with respect to a transport path provided for printing material and/or with respect to its embodiment as an air flow dryer 331 and/or a radiation dryer 331 and/or a hot air dryer 331 and/or an infrared radiation dryer 331 and/or a UV radiation dryer 331. In particular, the at least one second dryer 331 preferably has at least one second cooling roller 334, which further preferably represents at least one sixth motor-driven rotational body 334. The second cooling roller 334 preferably is and/or can be driven by means of a second cooling roller drive 341. The at least one second dryer 331 is preferably substantially and more preferably fully symmetrical in configuration to the at least one first dryer 301 in terms of the described components. The at least one second dryer 331 is preferably part of the same dryer unit 300 as the at least one first dryer 301 and is more preferably arranged in the same housing 329. In terms of a spatial arrangement, dryer unit 300, and therefore preferably the at least one first dryer 301 and the at least one second dryer 331, is preferably arranged between the at least one first printing unit 200 and the at least one second printing unit 400.

Along the transport path of printing material web 02, downstream of the at least one second dryer 331, at least one outfeed roller 501 is provided. The at least one outfeed roller 501 preferably has its own drive motor 504, embodied as outfeed roller drive 504. The at least one outfeed roller 504 preferably represents at least one seventh motor-driven rotational body 504. The at least one outfeed roller 501, preferably together with an outfeed pressure roller 502 that is and/or can be thrown onto the at least one outfeed roller 501, forms an outfeed nip 503, in which printing material web 02 is clamped and through which printing material web 02 is transported. Outfeed nip 503 preferably serves to regulate web tension and/or to transport printing material web 02.

With respect to the transport path of printing material web 02 upstream and/or downstream of outfeed roller 501, but particularly along the transport path of printing material 02 downstream of the at least one first dryer 301, at least one rewetting unit is preferably provided, which preferably compensates for any excess loss of moisture in printing material web 02 as a result of treatment by dryer unit 300.

Along the transport path of printing material web 02 downstream of outfeed nip 503 and/or downstream of the rewetting unit, at least one post-processing device 500 is arranged, which is preferably embodied as a folding apparatus 500 and/or has a sheet cutter 500 and/or a planar delivery unit 500, or is embodied as a winding apparatus 500. In and/or by means of this post-processing unit 500, printing material web 02 is preferably folded and/or cut and/or stitched and/or sorted and/or inserted and/or transported and/or wound.

In at least one variant of the printing press, printing press 01 is embodied as a web-fed rotary inkjet printing press 01, and at least one transfer element or a transfer body is arranged so as to form a transfer nip with the at least one first central printing cylinder 201. In that case, the at least one print head 212 is preferably aligned toward the at least one transfer element. By means of this element, the printing ink can be applied to printing material 02 directly or optionally indirectly via one or more additional transfer elements.

In the following, preferred embodiments of a printing press 01 that is operated and/or can be operated using the inkjet method, preferably in the manner of a printing press 01 as described above, but not restricted thereto, are described, along with operating modes and operating means that are and/or can be carried out with said printing press.

In one embodiment, the printing press can be characterized in that, in at least a first operating mode, e.g. an operation for producing newspaper or newspaper-like products or soft-cover products, a first printing material 02, in particular a printing material web 02, which is embodied as an uncoated or lightly coated offset printing paper, is or will be guided and/or printed or can be printed at least by means of a printing unit 200; 400 or by means of a printing element 211; 411. Here, printing material 02 is preferably embodied as a wood-containing, i.e. lignin-containing paper. In this case, the paper contains, e.g. at least 2% by weight, in particular at least 5% by weight woody fibers. Printing material 02 or the paper that serves as its base preferably has, e.g. a weight per unit area according to ISO 536 of between 35 and 80 g/m$^2$, preferably between 35 and 60 g/m$^2$. Printing material 02 is made, e.g. of uncoated newsprint, for example supercalendered (improved) by means of a soft calender (heated cast iron roller against a roller having an elastomeric outer surface), and/or of a minimally to lightly coated paper, and in the latter case has e.g. a coating, preferably on both sides, having a total coating weight, for example, of up to 25 g/m$^2$ and/or e.g. a weight per unit area of up to 80 g/m$^2$. The paper has, e.g., a Bendtsen roughness (ISO 8791-2) of at least 30 ml/min. To determine this roughness, a ring-shaped measuring area measuring 100×0.15 mm on the sample at a pressure of 10 N/cm$^2$ can be bombarded with air at a differential pressure of 15±0.2 bar. In a preferred enhancement, the printing material 02 embodied as paper can contain at least a percentage, e.g. at least 10%, preferably at least 20%, secondary fibers obtained from used recycled paper. Printing material 02 can have a material thickness d02, generally referred to as thickness d02, of 50 to 120 µm, in particular of 60 to 110 µm (e.g. according to ISO 534).

First printing material 02 preferably does not have any coating on its surface to be printed that is strengthened with or at least contains hygroscopic salts, e.g. alkaline or alkaline-earth chlorides, in particular calcium chloride (CaCl$_2$).

Printing press 01 can particularly be characterized in that, e.g. at least in the first operating mode, e.g. an operation for producing newspaper or newspaper-like products or book products, a first printing material 02, in particular a printing material web 02, which is embodied on its surface to be printed without any additional coating on the printing material that forms the base material, is or will be guided and/or printed or can be printed at least by means of a printing unit 200; 400 or a printing element 211; 411. In other words, the first printing material 02 is formed as a single layer and/or homogeneously from the fiber material composite enhanced, e.g., with filler, sizing agent and/or auxiliary substances, and is smoothed in the surface region using only a calender, e.g. as either machine-finished newsprint or optionally as so-called "improved newsprint". Printing material 02 is preferably embodied in at least this operating mode as an uncoated offset printing paper, i.e. without additional cost-intensive coatings and/or coatings that may weigh the paper down unnecessarily, whether as adhesive coatings or spread coatings. In this case, for example, a binder may be added as so-called "engine sizing" to the fiber slurry, the so-called "liquor" that contains the additives, before the paper is manufactured, and is therefore a constituent element of the e.g. otherwise uncoated printing material 02 or paper. This printing material 02 made of paper that optionally comprises the engine sizing has no additional "surface sizing", i.e. no coating that contains sizing material, binder or a spread coating. In this uncoated embodiment, printing material 02 can have a thickness d02 of 50 to 100 µm, in particular 60 to 90 µm.

First printing material 02 of the at least first operating mode is preferably embodied without surface sizing and/or preferably as uncoated paper, preferably so-called newsprint paper, and is machine finished or improved or supercalendered by calendering. This type of printing material 02 is hereinafter also referred to as newsprint paper or simply as newsprint. Printing material 02, which is embodied, e.g. in the form of a printing material web 02 and is preferably guided through at least one printing unit 200; 400 or one printing element 211; 411, can be made, for example, of open-pored and/or optionally supercalendered and/or particularly wood-containing (i.e. lignin-containing) paper, e.g. optionally as so-called "uncoated paper" (i.e. with an untreated, optionally only mechanically supercalendered surface). This paper may also contain a percentage of recycled used paper (e.g. at least 50% secondary fibers originating from recycled paper), or it may even be a printing material 02 produced substantially from recycled paper. The wood content (particularly the lignin) of the newsprint contributes to the stiffness of the primarily large-surface and thin pages of a finished newspaper-like or newspaper product.

This first printing material 02, embodied particularly, for example, as commercially available newsprint and/or as paper without surface sizing and/or preferably as uncoated paper, has, e.g. a weight per unit area according to ISO 536 of preferably between 35 and 60 g/m$^2$, in particular of 40 to 50 g/m$^2$ for "normal" (machine finished) paper, and e.g. 50 to 60 g/m$^2$ for improved paper. Printing material 02 embodied as above and printed or to be printed here preferably in an inkjet method in at least a first operating mode or press variant, has, for example, a Bendtsen roughness (ISO 8791/2) of e.g. more than 70 ml/min, in particular more than 80 ml/min or even at least 100 ml/min (machine finished).

In an alternative embodiment or operating mode to the first operating mode, or in a second operating mode that can optionally be carried out or in a second press embodiment, a minimally or lightly coated, preferably wood-containing paper is provided as (second) printing material 02. The paper can be embodied as LWC (Low Weight Coated) paper having e.g. a coating weight of 10 to 25 g/m$^2$ coating, as ULWC (Ultra Low Weight Coated) paper having e.g. a coating of 5 to 10 g/m$^2$, or as FC (Film Coated) paper having e.g. a coating weight of less than 5% but not equal to zero. The paper in this case is coated on both sides, for example, and the coating weight is indicated as the total weight of both sides. The second printing material 02 or the paper that serves as its base—including the coating—has e.g. a weight per unit area according to ISO 536 of preferably between 40 and 80 g/m$^2$, in particular of 40 to 75 g/m$^2$. The second printing material 02, embodied as paper, preferably has a lower roughness than the newsprint which is optionally located and/or printed e.g. in the first operating mode in printing press 01. The maximum Bendtsen roughness (ISO 8791/2) is 60 ml/min, for example, particularly even a maximum of 50 ml/min. However, this second printing material 02 made of paper that optionally comprises the engine sizing and a minimal or light spread coating further preferably has no additional "surface sizing", i.e. no coating that contains sizing material or any other type of binder. Second printing material 02 in this coated embodiment can have a thickness d02 of 60 to 120 μm, in particular of 70 to 110 μm.

In an alternative embodiment or operating mode to the first and/or second operating modes, or in a third operating mode or press embodiment that can optionally be implemented, a printing material 02, the character of which may overlap somewhat with the first and/or the second printing material 02, is embodied as having an absorbency in the region of its surface to be printed that corresponds to a maximum water absorption according to Cobb 60 (ISO 535) of 70 g/m$^2$, in particular a maximum of 60 g/m$^2$. This may also be applied to preferably coated papers or optionally only lightly or minimally coated papers of the second printing material embodiment. In one embodiment, the third printing material 02 is characterized in that it comprises a surface to be printed which has a spread coating having a coating weight of more than 20 g/m$^2$, e.g. at least 25 g/m$^2$, or which is made of plastic or metal or varnish, and is particularly embodied as a plastic or metal film 02 or as web 02 or sheet 02 having a varnished or metallic or plastic surface, and/or is embodied as having an absorbency corresponding to a water absorption according to Cobb 60 (DIN 53132) of less than 5 g/m$^2$, particularly less than 1 g/m$^2$.

In one variant of the first, second or third operation or printing material 02, the infed or printed printing material 02 is embodied as paper or cardboard having a base weight of 30 g/m$^2$ to 450 g/m$^2$ per unit area and/or having a Bendtsen roughness in the region of its surface to be printed of at least 30 ml/min and/or at most 200 ml/min and/or between 30 and 200 ml/min. In the third embodiment of the operation or of printing material 02, the printing material is embodied as having an absorbency corresponding to a maximum water absorption according to Cobb 60 of 70 g/m$^2$, in particular a maximum of 60 g/m$^2$, due to a spread coating or some other type of surface finishing and/or surface compression in the region of its surface to be printed.

Additionally or alternatively, in a variant of the first, second or third operation or printing material 02, printing material 02 is embodied in the region of its surface to be printed without a surface finishing e.g. known in inkjet printing, in particular without surface finishing that comprises silicate pigments and/or polyvinyl pigments. In a particular variant, the first, second or third printing material 02 embodied as paper or cardboard is embodied as completely uncoated printing material 02, e.g. printing material web 02.

To enable particularly distinct contours in the print image and/or a high printing speed, the printing ink used here in the inkjet process can be embodied as having particularly low viscosity, which favors penetration into the respective, in particular the first or optionally the second printing material 02 and/or the flow on the surface of the optionally second or particularly third printing material 02. The former can result in the moisture penetrating deep into the printing material, so that it must be correspondingly removed in a time intensive and/or energy intensive process. With a corresponding porosity of printing material 02, the aqueous fluid can also carry the color particles dispersed in it into the interior of the printing material if these particles e.g. have a relatively small mean diameter, which can lead to a substantial decline in color brilliance and optionally to an intensified translucency. As a result of flow, the latter can likewise lead to a substantial deterioration in print quality.

To address the stated problem, e.g. even for printing materials 02 that have not been specially optimized for inkjet printing, and/or in industrial inkjet printing, a water-based printing ink is provided, as is characterized below in one or more variants. The printing ink described in the following is preferably an inkjet ink.

The printing ink provided and/or used for printing in printing press 01, in particular in one or more print heads 212; 412 of a printing press 01 embodied as an inkjet printing press, in which, for example, an aforementioned first, second or third printing material 02 is provided and/or can be printed and/or is printed in optionally one of its variants or particular configurations, is embodied as water-based—e.g. for all of the following embodiments and/or variants—and preferably has a viscosity of 4.0 to 10.0 cP, preferably of 5.0 to 9.0 cP, measured, for example, using a Bohlin viscometer (spindle 18, 100 rpm, e.g. at 25°).

This printing ink preferably has—e.g. for all of the following embodiments and/or variants—a surface tension of e.g. 20 to 40 mN/m, in particular 25 to 35 mN/m$^2$ or dyn/cm, measured, for example, using a Sensadyne ST at a measuring temperature of 25°.

In one or more of the aforementioned embodiments of the printing ink, the ink—e.g. for all of the following embodiments and/or variants—preferably contains color pigments F having a maximum mean diameter, measured, for example using a Nanotrac analyzer, of 0.2 μm, in particular a maximum of 0.15 μm.

In one or more of the aforementioned embodiments of the printing ink, its density—e.g. for all of the following embodiments and/or variants—is preferably between 1.05 and 1.25 g/ml, in particular between 1.10 and 1.08 g/ml.

In one or more of the aforementioned embodiments of the printing ink, the ink—e.g. for all of the following embodiments and/or variants—preferably contains e.g. an organic binder, in particular a polymer P, e.g. a hydrocarbon polymer. In principle, this polymer can be a styrene polymer, a halogenated hydrocarbon polymer, a vinyl polymer, e.g. a fluorinated acrylic polymer, a fluorinated or non-fluorinated methacrylic polymer, a polyether copolymer or copolymers thereof, or a mixture of two or more of the aforementioned substances.

However, in a first embodiment the printing ink can comprise an acrylic-based polymer or copolymer, e.g. an acrylate and/or, for example, a polymer P from the group of polyvinyl esters, e.g. polyvenyl acetate P. The degree of polymerization can be 100 to 5,000. The glass temperature is e.g. between 15 and 50° C.

For example, in a first variant of the first advantageous embodiment of the printing ink, at least 0.1% by weight, e.g. at least 1% by weight, in another variant at least 3% by weight, and in a further variant at least 5% by weight of the printing ink is made up of the polymer, with the maximum limit being, e.g. 30% or alternatively 15% by weight. The percentage of water is at least 30%, preferably at least 50%, for example. The pigment fraction, specified as a solid substance, can be 2 to 10% by weight, in particular 3 to 8% by weight in one variant, and can be 3 to 20%, in particular 5 to 15% by weight in an alternative variant. The total of these three constituents, depending on the addition of further ingredients, can make up 80 to 100%, alternatively 90 to 100%, and further alternatively 95 to 100% of the printing ink. In addition to the three components, auxiliary substances, e.g. surface-active and/or defoaming agents, and/or a cosolvent may be provided as additional constituents.

In a preferred variant of the first embodiment of the printing ink, the ink comprises as constituents 0.1 to 30% an acrylate or polyacrylate, 30 to 60% water, 0.1% to 20% a resin or copolymer, 2 to 10% a pigment fraction, 0.1 to 5% auxiliary substances, e.g. comprising surface-active and/or defoaming agents, and up to 25% a cosolvent. The ink advantageously comprises 0.5 to 4.8% a surface-active substance, in particular a wetting agent.

In an alternative, second embodiment, the printing ink can particularly comprise an ethylene polymer, in a third embodiment a propylene polymer or in a further embodiment a butene polymer as polymer P. In a first variant of this second embodiment of the printing ink, for example, likewise at least 1% by weight, in another variant at least 3%, and in a further variant at least 5% by weight of the printing ink is made up of the polymer, with the maximum limit being e.g. 30% or alternatively 15% by weight. The water fraction likewise makes up at least 30%, preferably at least 50%, for example. Here again, the pigment fraction can be 3 to 20%, and in an alternative, 5 to 15%. The total of these three constituents can make up 80 to 100%, alternatively 90 to 100%, and further alternatively 95 to 100% of the printing ink, depending on the addition of other ingredients.

For polymers P or mixtures of polymers P other than those specified for the two advantageous embodiments, in particular polymers P or mixtures that are present in the form of organic or hydrocarbon polymers or copolymers, at least 0.1% by weight, e.g. at least 1% by weight, can likewise be made up of the polymer P or a mixture of such polymers P, in another variant at least 3%, and in a further variant at least 5% by weight of the printing ink can be made up of the polymer P, with the maximum limit being e.g. 30% or alternatively 15%. The water fraction in this case also makes up, for example, at least 30%, preferably at least 50%. In one variant, a pigment fraction specified as a solid substance can likewise be 2 to 10%, in particular 3 to 8% by weight, and in an alternative variant 3 to 20%, in particular 5 to 15%. The total of these three constituents can make up 80 to 100%, alternatively 90 to 100%, further alternatively 95 to 100% of the printing ink, depending on the addition of other ingredients. In addition to the three components, auxiliary substances, e.g. surface-active and/or defoaming agents and/or a cosolvent, can be provided as additional ingredients.

In addition to the water base, the color pigments and preferably polymer P, a surface-active substance, e.g. a wetting agent, can be provided for decreasing the surface tension.

In addition to the water base, the color pigments, preferably the polymer and optionally the wetting agent, a dispersant that supports and/or stabilizes dispersion can be provided.

In one or all of the aforementioned or the following embodiments, the dry printing ink has a surface hardness determined e.g. according to the 3H pencil hardness test (Erichsen pencil hardness), i.e. it must be scratch-proof to this degree.

In one or all of the aforementioned or the following embodiments, the printing ink is embodied as black ink and, on a paper or printing material 02 that is without a spread coat and/or is uncoated as described above, has reflection value measured according to DIN 16536 of 1.2 to 1.6, in particular 1.3 to 1.5.

In one or all of the aforementioned or the following embodiments, the dried printing ink has a gloss at an angle of 60° of <60%, preferably <55%, which is determined according to DIN 67530, for example, using a reflectometer, e.g. a micro tri gloss from the BYK-Gardner company.

In an advantageous embodiment, printing press 01 is operated in a first operating mode and/or variant using a first uncoated printing material 02 as described above and a first printing ink, and is operated in a second operating mode and/or variant using a second printing material 02—e.g. minimally, lightly coated as described above—and the same or a second printing ink having pigmentation for producing the same hue. In the case of a second printing ink, however, this ink can differ from the first printing ink in terms of the percentage by weight of the polymer, e.g. by at least 5%, in particular 10% by weight of the polymer. In particular, the second printing ink has a lower percentage by weight of the color mass.

Figure 3:
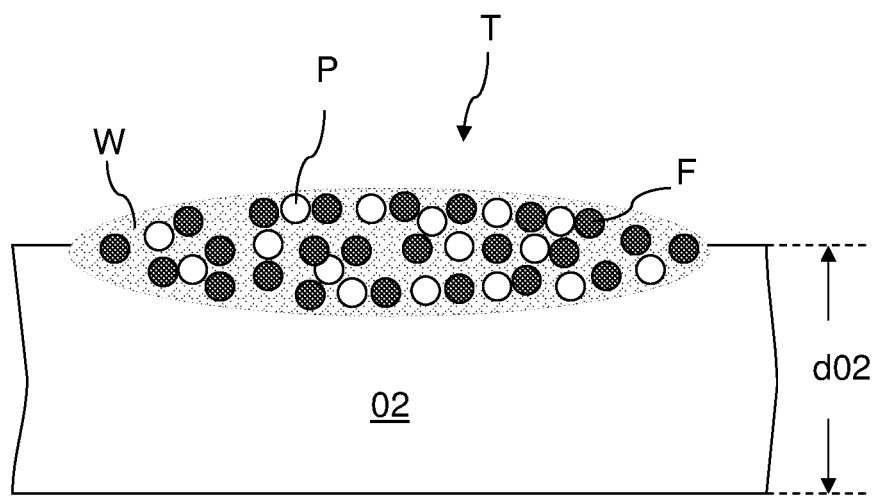
FIG. 3 a diagram illustrating the principle of an ink droplet applied to a printing material a) before and b) after drying.
Figure 3:
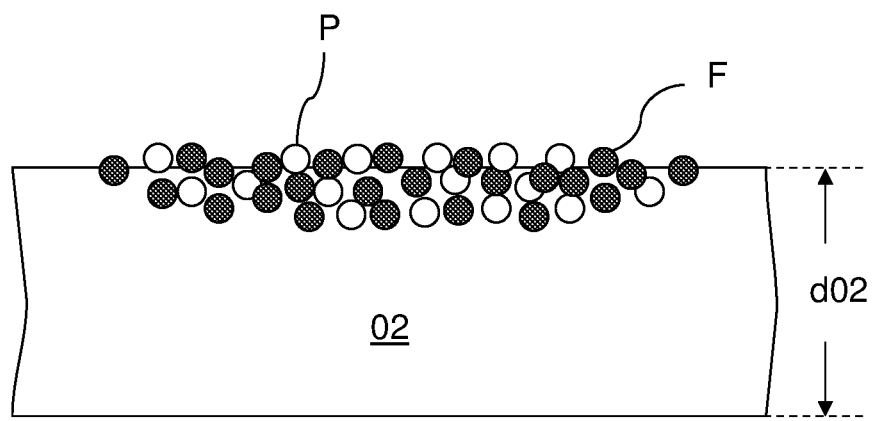

The polymer-containing printing ink, in particular inkjet ink, is very particularly advantageous in combination with the printing press 01 embodied as an inkjet or ink-jet printing press 01, in which an aforementioned printing material 02 is printed in the manner of an offset paper. When the aqueous color droplets, i.e. the ink droplets T (see, e.g. FIG. 3), strike printing material 02, the color pigments are at least largely held by the polymers in the region of the printing material surface. An absorption of the color pigments together with aqueous phase W is blocked to a large extent (see, e.g. FIGS. 3a) and b)).

The quality of polymer P and its ratio by mass to pigments P is adjusted such that, in the substantially dry printed printing material 02, e.g. at least 80%, preferably 90% of the pigments of an ink droplet T lie in an outer layer thickness of printing material 02, which has a thickness of e.g. 20 µm, preferably 10 µm, and/or 20%, preferably 10% of the printing material thickness. The substantially dry state can describe a state of the printed printing material 02 after a residence time of one hour, for example, under ISO conditions (temperature 15° C., pressure 1.013 bar, atmospheric humidity 60%).

In one advantageous embodiment—in particular in combination with an aforementioned, e.g. first, second or particularly third printing material 02 and/or in connection with an aforementioned, e.g. preferably first or optionally other embodiment of the printing ink—printing press 01 is embodied as having, downstream of inkjet print head 212; 412 in the printing material path, a supplemental drying means 219; 419, e.g. an above-described dryer 301; 331 which interacts indirectly or preferably directly with printing material 02, in particular with at least the first side of the printing material, and/or as having a blower unit, by means of which a fluid flow—particularly at high pressure—can be directed onto the freshly printed side of the printing material, e.g. a so-called air blade 219; 419 or air knife can be directed onto the side of the printing material. In the printing material path upstream of the dryer 301; 331 and/or the blower unit 219; 419, upstream and/or downstream of the at least one inkjet print head 212; 412, an application device 217; 218; 417; 418 in the form of an energy source 217; 417 that introduces energy and/or in the form of an application unit 218; 418 that applies a reaction component which reacts exothermally when it comes into contact with a component that is already on or in the printing material or contained in the printing ink is provided, which is directed onto at least the first printing material side of the not yet printed or already printed printing material 02 (or onto the corresponding location in the web path). Only one application device may be provided, e.g. preferably the energy source 217; 417 or alternatively the application unit 218; 418, or both such application devices 217; 218; 417; 418 may be provided. Application device 217; 417, embodied as energy source 217; 417, is preferably arranged downstream of the printing region, i.e. of the ink application, in particular in the printing material path downstream of the at least one printing unit 200; 400, upstream of a first or the sole supplemental drying means 301; 331; 219 provided in the printing material path, and application device 218; 418, embodied as application unit 218; 418, is arranged upstream of the printing region, i.e. the ink application, in particular in the printing material path upstream of the single or first printing units 200; 400 through which printing material 02 passes.

In principle, reaction components that release heat in this manner can be any pairs of substances which undergo a physical and/or chemical change when they are brought together, giving off heat. For example, the pair of substances comprises a halogen, e.g. bromine, and an unsaturated hydrocarbon, e.g. an alkene, in particular ethylene, wherein the latter is a constituent in the printing ink and the former is, for example, a constituent of a fluid to be applied by application unit 218; 418.

In the embodiment and/or the operating mode of printing press 01 that has a printing material 02 made of paper or cardboard, an application device 218; 418 in the form of a means comprising an initiator for polymerizing monomers contained in the printing ink and/or in the form of an application unit for applying an agent that comprises a substance that benefits the solubility of a polymer and/or copolymer contained in the printing ink can be alternatively or additionally provided in the printing material path situated upstream of the dryer 301; 331 and/or air blade 219 and/or downstream of the at least one inkjet print head 212; 412.

As energy source 217; 417, a source that transfers energy via thermal contact, e.g. thermal conduction and physical contact with a heating device, or preferably without contact, to the—e.g. first, second or third—printing material 02, in particular a radiation source 217; 417, preferably an electromagnetic radiation source in the IR or NIR, UV or visible spectral range, e.g. in the form of a laser device 217; 417 or an ultrasound source can be provided. In the embodiment as a laser device 217; 417, this device can be embodied, for example, as a laser device 217; 417 configured, for example, to emit ultrashort laser pulses, e.g. having a pulse length of less than $1 \cdot 10^{-6}$ s, in particular a maximum of $1 \cdot 10^{-7}$ s, of high power density, e.g. at least 100 W/mm$^2$, in particular at least 400 W/mm$^2$, referred to the mean value, over the beam cross-sectional area, wherein the beam cross-sectional area is understood as the cross-sectional area at the height of the beam outlet that lies within the 10% limit of maximum intensity. To generate these laser pulses, the laser device 217; 417 can be embodied as a system which has beam decoupling, particularly beam decoupling that is independent of beam generation. The laser beam can be moved across the width of the printing material by means of an optical device, for example. A plurality of such pulsating lasers—having a stationary beam or a beam that oscillates transversely to the printing material—may be provided side by side in the laser device 219; 419, transversely to the printing material width.

As application unit 218; 418, an application device that applies an ionic or radical initiator can be provided. As the ionic fluid, a fluid can be applied, which contains, for example in at least a significant concentration, e.g. at least 1.0% by weight, a salt, for example at least partially dissolved, having a melting point of less than 100° C. at 1 bar ambient pressure. This is preferably a salt that is already liquid at 21° C. and 1 bar ambient pressure.

Application unit 218; 418 can be embodied as a contact-free spray device or as a contact-based spreading or dipping device.

In the case of an application device 217; 418; 417; 418 provided in the printing material path upstream of the at least one inkjet print head 212; 412, said device is arranged with its functional end that is close to the print head e.g. spaced at most by a distance that is traveled during print operation in two seconds, preferably in one second, and/or by a maximum of 1.0 m, in particular by a maximum of 0.5 m, preferably a maximum of 0.2 m, upstream of the upstream functional end of the inkjet print head or the first of a plurality of inkjet print heads 212; 412 of printing element 211; 411, arranged offset from one another and/or one behind the other as viewed in the transport direction, and/or between the upstream functional end of the inkjet print head or the first of a plurality of inkjet print heads 212; 412 of printing element 211; 411, arranged offset from one another and/or one behind the other as viewed in the transport direction, and a first roller 203; 403 that is at least partially wrapped and is situated upstream of printing element 211; 214 in the web path, and/or directed onto the circumference of a central cylinder 201; 401 and/or in or on the frame of printing element 211; 411.

In the case of an application device 217; 218; 417; 418 provided in the printing material path downstream of the at least one inkjet print head 212; 412, said device is arranged with its functional end that is close to the print head spaced at most by a distance that is traveled during operation in one second and/or by a maximum of 1.0 m, in particular by a maximum of 0.5 m, preferably by a maximum of 0.2 m, downstream of the downstream functional end of the inkjet print head or the last of a plurality of inkjet print heads 212; 412 of printing element 211; 411, arranged offset from one another and/or one behind the other as viewed in the transport direction, and/or between the downstream functional end of the inkjet print head or the first of a plurality of inkjet print heads 212; 412 of printing element 211; 411, arranged offset from one another and/or one behind the other as viewed in the transport direction, and a first roller 214; 414 that is at least partially wrapped and is situated downstream of printing element 211; 214 in the web path, and/or is directed onto the circumference of a central cylinder 201; 401 and/or in or on the frame of printing element 211; 411.

In a—e.g. preferred embodiment of printing press 01—in connection with all the embodiments of the printing ink and/or printing material 02—inkjet print head 212 of printing element 211; 411 is directed directly onto printing material 02 or onto printing material 02 that wraps around a central cylinder 201; 401.

In an alternative that may be advantageous with respect to optimizing the media—in connection with all the embodiments of the printing ink and/or printing material 02—inkjet print head 212 of printing element 211; 411 is directed onto a transfer means embodied e.g. as transfer tape or transfer cylinder, and the ink applied to the latter can be transferred or is transferred by said means, indirectly or directly, onto printing material 02.

The medium to be applied by application unit 218; 418 can contain a surface-active substance, in particular a surfactant, and/or can be present in the form of a fluid having a maximum solid fraction of 10%.

For the stated embodiments, the inkjet print head (212) has an ink reservoir and/or a line connection to an ink reservoir containing a water-based printing color embodied as ink, which comprises as constituents both color pigments F and a polymer P, and which is preferably configured in one of the aforementioned embodiments or variants, in particular the first embodiment.

Polymer P in one of the aforementioned embodiments, by its consistency and/or its ratio by mass as compared with the fraction of color pigments F, prevents color pigments F from penetrating together with aqueous phase W into the printing material, and/or, in the state before the printing ink has been applied, is at least partly physically attached and/or coupled physically to color pigments F, in particular fully or at least partially encompassing color pigments F.

During printing of a printing material in printing press 01, the—e.g. first or second or third—printing material 02 is printed in at least one printing unit 200; 400 or by means of at least one printing element 211; 411 by a direct or indirect inkjet method, with a printing ink embodied as ink, and in the continued process is dried on at least the printed side by an air blade 219; 419 and/or a dryer 301. On the printing material path upstream and/or downstream of the printing step, but downstream of a printing material source 100 provided at the start of the printing press and still upstream of dryer 301 and/or air blade 219; 419, energy in the form of heat and/or radiant energy, and/or a reaction component that reacts exothermally when it comes into contact with a component already on or in the printing material or contained in the printing ink, is applied to printing material 02 by means of an application device 217; 218; 417; 418.

Energy in the form of heat and/or radiant energy is preferably applied to printing material 02 on the printing material path downstream of the printing step, but still upstream of the supplemental drying means, e.g. dryer 301 and/or air blade 219; 419, by means of an application device 217; 417, without pretreatment with a primer that acts as an adhesion promoter, i.e., e.g. without an aforementioned printing material preparation device 202 that applies a primer in the printing material path between the printing material source provided at the start of the printing press and the printing step.

In one embodiment or operating mode, a—e.g. second or third—printing material 02 having a surface to be printed which has an absorbency that corresponds to a maximum water absorption according to Cobb 60 of 70 g/m$^2$, in particular a maximum of 60 g/m$^2$, is guided and printed by means of printing element 211; 411. In an enhancement, a—e.g. third—printing material 02 having a surface to be printed which is made of plastic or metal or varnish, in particular printing material 02 embodied as a plastic or metal film or as a web or sheet having a varnished or metallic or plastic surface, and/or a printing material 02 having an absorbency corresponding to a water absorption according to Cobb 60 of less than 5 g/m$^2$, in particular less than 1 g/m$^2$, is guided and printed by means of printing element 211; 411.

In one embodiment or operating mode, a printing material 02 embodied as paper or cardboard having a base weight of 30 g/m$^2$ to 450 g/m$^2$ per unit area and/or having a Bendtsen roughness in the region of its surface to be printed of at least 30 ml/min and/or a maximum of 200 ml/min and/or between 30 and 200 ml/min can be guided or printed by printing element 211; 411.

In particular, a printing material 02 embodied as paper or cardboard having a base weight of 30 g/m$^2$ to 450 g/m$^2$ per unit area and/or having an absorbency in the region of its surface to be printed that corresponds to a maximum water absorbency according to Cobb 60 of 70 g/m$^2$, in particular a maximum of 60 g/m$^2$ and/or having a Bendtsen roughness in the region of its surface to be printed of at least 30 ml/min and/or at most 200 ml/min and/or between 30 can or will be guided and printed.

In a variant or in an operating mode that can alternatively or optionally be carried out, a printing material 02 made of a wood-containing paper having a weight per unit area of between 35 and 80 g/m$^2$ and/or having a surface to be printed that has a Bendtsen roughness of at least 30 ml/min can be printed by printing element 211; 411.

For the stated operating modes, a printing ink in e.g. an aforementioned embodiment, in particular in the first embodiment, is used.

In an advantageous operating mode—e.g. in combination with the printing ink in an aforementioned embodiment, in particular the first embodiment—, as a result of the application of energy after printing, preferably upstream of a dryer 30 and/or air blade 219; 419, in particular by heating to at least 55° C., preferably to at least 60° C., a melting of polymer particles that are present in the printing ink, in particular of polymer shells that encompass color pigments, and/or a filming of the polymer and e.g. a displacement of an aqueous phase toward the surface and/or an initialization of the polymerization process and/or a pre-drying of the applied printing ink occurs.

To minimize the penetration of the pigments and/or the flow, the reaction component is applied in the printing material path prior to printing e.g. such that, as printing material 02 is being conveyed during printing operation, no more than two seconds, in particular no more than one second, preferably no more than one-half second elapses between the end of application and the start of printing at the same point on the printing material.

To minimize the penetration of the pigments and/or flow, the energy is applied in the printing material path after printing, e.g. such that as printing material 02 is being conveyed during printing operation, no more than two seconds, in particular no more than one second, preferably no more than one-half second elapses between the end of printing and the start of application at the same point on the printing material.

During printing operation, a conveyance speed can be, for example, at least 60 m/min, preferably at least 120 m/min.

While preferred embodiments of a web-fed inkjet printing press and a method for printing a printing material in accordance with the present invention have been set forth fully and completely hereinabove, it will be apparent to one of skill in the art that various changes could be made without departing from the true spirit and scope of the present invention which is accordingly to be limited only by the appended claims.

What is claimed is:

1. A web-fed inkjet printing press comprising:
at least one printing unit usable to print a printing material embodied as a printing material web;
a printing material path along which the printing material web is being guided through the printing unit;
at least one inkjet print head in the printing unit to print the printing material web in an inkjet process using a water-based printing ink with a color of a defined hue, the water-based printing ink from the inkjet print head in the printing unit being directed directly onto the printing material web, the printing material web being a wood-containing, uncoated, single layer newsprint paper containing at least 2% by weight woody fibers, having a weight per unit area of between 35 and 80 g/m$^2$ and having a surface to be printed having a Bendtsen roughness of at least 30 ml/min, the printing material web being guided through the printing unit to interact directly with the at least one inkjet print head of the printing unit;

an ink supply system for the inkjet print head, the ink supply system containing the water-based printing ink, the water-based printing ink including, as constituents, both color pigments and one of a polymer and a copolymer, the water-based printing ink being directed from the inkjet print head directly onto the printing material which is embodied as the printing material web, which printing material web is wrapped around a central cylinder of the printing unit.

2. The web-fed inkjet printing press according to claim 1, wherein the printing material web is wrapped around the central cylinder at a wrap angle of at least 180°.

3. The web-fed inkjet printing press according to claim 1, further including an energy application device for applying energy to the printing material web, the energy application device being provided in the printing material path downstream of the at least one printing unit and upstream of one of a first and a single supplemental drying means which is provided in the printing material path.

4. The web-fed inkjet printing press according to claim 1, further including a substrate application device, for applying a substrate, other than a coating, to the printing material web, the substrate application device being provided in the printing material path upstream of the printing unit through which the printing material web passes, by which substrate application device, one of an initiation and an acceleration of a polymerization process is achieved.

5. The web-fed inkjet printing press according to claim 1, wherein the printing material web has a thickness of 50 to 120 μm.

6. The web-fed inkjet printing press according to claim 1, wherein the one of the polymer and the copolymer contained in the printing ink is one of an organic and a hydrocarbon polymer and a copolymer, one of an acrylic-based polymer and copolymer, an ethylene polymer, one of a propylene polymer and a butene polymer and as a mixture of a plurality of these polymers.

7. The web-fed inkjet printing press according to claim 1, wherein the printing ink has at least one of a viscosity of 4.0 to 10.0 cP, a surface tension of 20 to 40 mN/m and a density of between 1.05 and 1.25 g/ml.

8. The web-fed inkjet printing press according to claim 1, wherein the printing ink comprises, as a further constituent, one of a wetting agent and a dispersant, in addition to a water base, the color pigments and the polymer.

9. The web-fed inkjet printing press according to claim 1, wherein one of at least 5% by weight and at most 30% by weight of the ink is made up of the polymer, and at least 30% by weight is made up of a water fraction and 3 to 20% by weight is made up of a pigment fraction specified as a solid substance.

10. A method for printing a printing material, embodied as a printing material web, in a web-fed inkjet printing press including:

directing the printing material web to at least one printing unit of the web-fed inkjet printing press for printing the printing material web, in a direct inkjet method, with a printing color embodied as a water-based printing ink;

providing at least one inkjet print head in the at least one printing unit of the web-fed inkjet printing press;

applying the water-based printing ink, using the at least one inkjet print head, directly to the printing material web;

providing the printing material web being made of a wood-containing, uncoated, single layer newsprint paper containing at least 2% by weight woody fibers, having a weight per unit area of between 35 and 80 $g/m^2$ and a surface to be printed having a Bendtsen roughness of at least 30 ml/min, wrapping the printing material web around a central cylinder of the at least one printing unit; and printing the wood containing, uncoated, newsprint paper forming the printing material web with the printing color, which is embodied as the water-based printing ink, which water-based printing ink including, as constituents, both color pigments and a polymer, using the at least one inkjet printing head in the at least one printing unit.

11. The method according to claim 10, further including printing the printing material web using the web-fed inkjet printing press with the printing ink which is embodied as water-based and comprising, in an aqueous phase, color pigments and a polymer, which polymer preventing, due to one of its consistency and its ratio by mass as compared with the fraction of color pigments, the color pigments from penetrating, together with the aqueous phase, into the printing material.

12. The method according to claim 10, further including printing in a first operating mode, a first uncoated printing material web with a first printing ink and in a second operating mode, printing a second one of a minimally and a lightly coated printing material web with a second printing ink, the first and second printing inks each having pigmentation for producing substantially the same hue, and differing from one another in terms of a different percentage, by weight, of the polymer.

* * * * *